(12) United States Patent
Kanbara et al.

(10) Patent No.: US 6,407,771 B1
(45) Date of Patent: *Jun. 18, 2002

(54) CAMERA HAVING AN IMAGE SHIFT DETECTING FUNCTION

(75) Inventors: Tetsuro Kanbara, Sakai; Yoshihiro Hara, Kishiwada; Keiji Tamai, Higashiosaka; Kohtaro Hayashi, Toyonaka, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/512,646

(22) Filed: Aug. 8, 1995

(30) Foreign Application Priority Data

Aug. 8, 1994 (JP) .............................. 6-185058

(51) Int. Cl.⁷ .............................. H04N 5/228
(52) U.S. Cl. ..................................... 348/208
(58) Field of Search .................. 348/208, 699

(56) References Cited

U.S. PATENT DOCUMENTS

| | | | | |
|---|---|---|---|---|
| 5,012,270 A | * | 4/1991 | Sekine et al. ................ | 348/208 |
| 5,053,876 A | * | 10/1991 | Blissett et al. ............... | 348/208 |
| 5,107,293 A | * | 4/1992 | Sekine et al. ................ | 348/208 |
| 5,130,735 A | * | 7/1992 | Kusaka et al. .............. | 396/104 |
| 5,157,732 A | * | 10/1992 | Ishii et al. ................... | 348/208 |
| 5,184,216 A | * | 2/1993 | Kobayashi ................... | 348/208 |
| 5,204,741 A | * | 4/1993 | Sakaguchi ................... | 348/208 |
| 5,218,442 A | * | 6/1993 | Hamada et al. ............. | 348/208 |
| 5,291,300 A | * | 3/1994 | Ueda ............................ | 348/208 |
| 5,313,296 A | * | 5/1994 | Ohki ........................... | 348/208 |
| 5,317,685 A | * | 5/1994 | Morimura et al. .......... | 382/309 |
| 5,365,304 A | * | 11/1994 | Hamada et al. ............. | 348/208 |
| 5,371,539 A | * | 12/1994 | Okino et al. ................ | 348/208 |
| 5,386,264 A | | 1/1995 | Sekine et al. | |
| 5,563,652 A | * | 10/1996 | Toba et al. .................. | 348/208 |
| 5,581,309 A | * | 12/1996 | Okino et al. ................ | 348/699 |
| 5,627,586 A | * | 5/1997 | Yamasaki .................... | 348/208 |

FOREIGN PATENT DOCUMENTS

| | | |
|---|---|---|
| JP | 59-28606 | 2/1984 |
| JP | 63-166369 | 7/1988 |

\* cited by examiner

Primary Examiner—Wendy R. Garber
Assistant Examiner—Aung S. Moe
(74) Attorney, Agent, or Firm—Burns, Doane, Swecker & Mathis, LLP

(57) ABSTRACT

A camera having an image shift detecting function is provided with an optical system which forms a subject image, an image sensing device which converts light of the subject image into an electric signal, an image shift detecting sensor which detects a relative shift between the camera and the subject image based on an output of the image sensing device and a microcomputer which compensates for the relative shift between the camera and the subject image based on an image shift amount detected by the image shift detecting sensor. The microcomputer specifies an area of the image sensing device based on a direction of luminance variation of the subject image and the image shift detection is made by using only an output corresponding to the specified area.

11 Claims, 33 Drawing Sheets

(i) h=V=1

(ii) h=1, V=-1

(iii) h=-1, V=1

(iv) h=V=-1

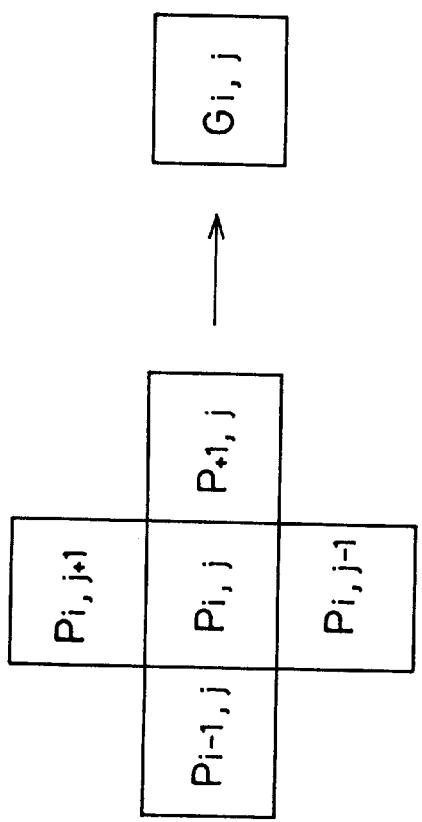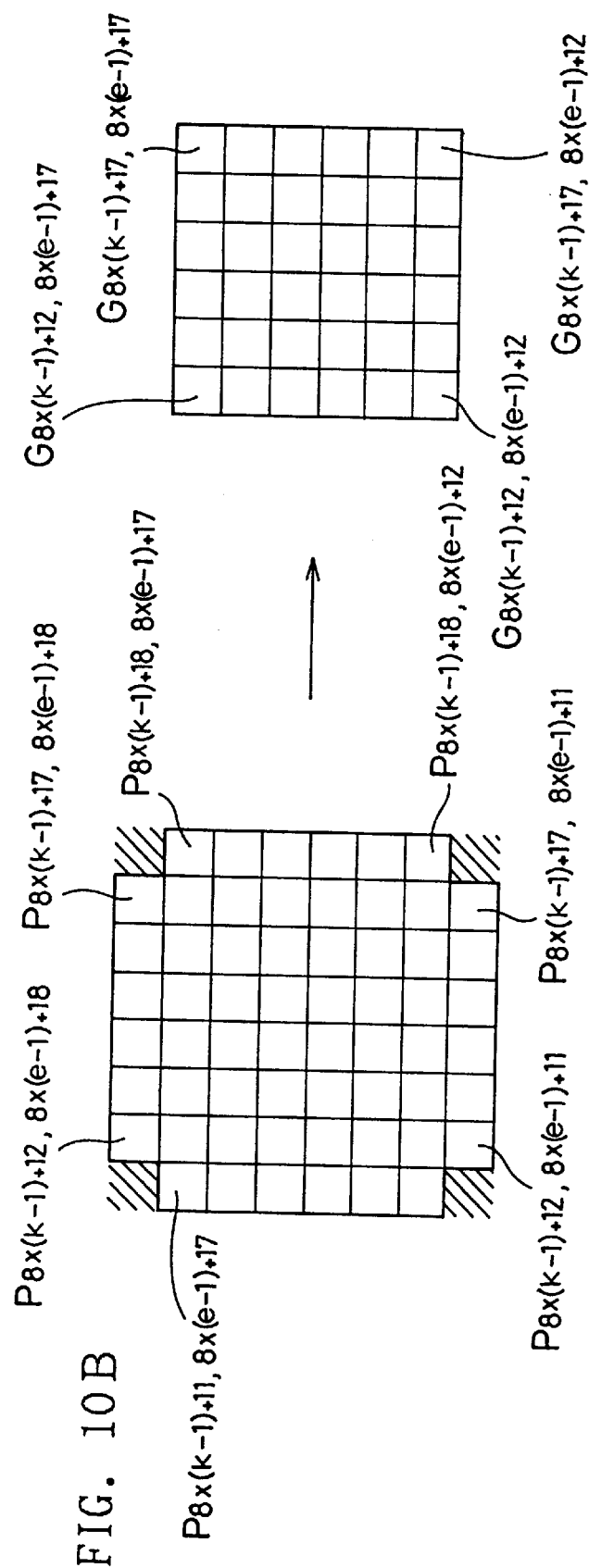
FIG. 10A
FIG. 10B

FIG. 35

POWER ON OR ACTIVATION AFTER SLEEP OF PREDETERMINED PERIOD

| ACTIVATE MICROCOMPUTER WAIT UNTIL OUTPUT STABILIZED | WAIT UNTIL OUTPUT OF DRIVING CIRCUIT STABILIZED | MEASURE G1 LENS CONVERSION COEFFICIENTS Kma & La | MEASURE G2 LENS CONVERSION COEFFICIENTS Kmb & Lb | STANDBY |

CAMERA HAVING AN IMAGE SHIFT DETECTING FUNCTION

BACKGROUND OF THE INVENTION

1. Field of the Invention

The present invention relates to a video camera and an electronic still camera, and more particularly, to a camera having a function to detect a relative shift between the camera body and the subject image caused due to camera shake in photographing.

2. Description of the Prior Art

Typically, a solid-state image sensing device such as a charge coupled device (CCD) is used in a camera of the above-mentioned type. In the present specification, hereinafter, a relative movement between a camera body and a subject is referred to "image shift". The precision of image shift detection by the solid-state image sensing device depends on the luminance distribution of the subject. Conversely, the precision of image shift detection can be estimated to some degree by analyzing the luminance distribution of the subject image formed on the light receiving surface of the solid-state image sensing device. Therefore, by detecting an image shift by using only a partial area of the solid-state image sensing device which is estimated to have a sufficiently high image shift detection precision, a high detection precision is obtained with a small number of data and a small amount of calculation. What is important in this case is to correctly estimate the detection precision.

As conventional technical means for compensating for camera shake in photographing with a camera of the above-mentioned type, for example, the following means are known: a means as disclosed in Japanese Laid-open Patent Application S63-166369 in which the image plane is divided into a plurality of blocks and the image shift amount is obtained for each block to determine the vector of the entire image plane (first prior art); a means as disclosed in Japanese Published Patent Application H3-65509 in which a plurality of moving subject detecting devices are provided to detect a moving subject by calculating the image shift amount for each moving subject detecting device and adding the calculated shift amounts to average them (second prior art); a means as disclosed in U.S. Pat. No. 5,386,264 in which, in an apparatus to detect an image shift based on a video signal, the image shift detection is performed only when a high-frequency component of the video signal or a sharpness exceeds a predetermined value and is not performed when the high-frequency component or the sharpness is the predetermined value or below (third prior art); and a means as disclosed in U.S. Pat. No. 5,218,442 in which the image plane is divided into a plurality of blocks and a plurality of blocks are selected from thereamong in the order of height of the contrast so that the image shift detection is performed only with respect to the selected blocks (fourth prior art).

However, in the first prior art, since the calculation of the image shift amount is performed for all the blocks and not for only a part of the blocks, the amount of calculation inevitably increases, so that a large capacity memory is required. In the second prior art, since the calculation is performed for all the moving subject detecting devices, the same problem as that of the first prior art arises. In the third prior art, the detection area is selected only by using a high-frequency component of a video signal or a sharpness and the direction of luminance variation of the subject is not used as a factor for the image shift detection. Likewise, in the fourth prior art, the detection area is selected by using the magnitude of the contrast and the direction of luminance variation of the subject is not used.

Subsequently, a specific operation to select a part of the solid-state image sensing device as the detection area will be described in more detail. Typically, the image shift detection is made with respect to two directions: the horizontal and vertical directions of the photographic image plane. It is therefore considered to select as the detection area a part where the sharpness or the contrast of the video signal in the horizontal and vertical directions is high. In the above-mentioned fourth prior art (U.S. Pat. No. 5,218,442), contrast is detected with respect to the two directions for each block and an area is selected based on the magnitude of the contrast.

Assume now that a certain part of a solid-state image sensing device receives a subject image as shown in FIG. 1. The subject image has a sufficient sharpness or contrast in the horizontal and vertical directions. Therefore, according to the above-described selection method, the part receiving this subject image may be selected as the detection area.

In actuality, however, in this subject image, since the output of the solid-state image sensing device does not vary when the subject is moved in the direction L in the figure, it is impossible to detect any image shift. Therefore, such a subject image is inappropriate for image shift detection and the part receiving it should not be selected as the detection area.

Assume that there are two subject images of different shapes as shown in FIGS. 2A and 2B. For the same reason as that of the above case, in the subject image of FIG. 2A, although the image shift detection precision is high when the subject is moved in the direction M in the figure, the image shift detection precision is inferior when the subject is moved in the direction N. This is because the luminance variation (contrast) of the subject image is great in the direction M but small in the direction N. On the contrary, in the subject image of FIG. 2B, since the direction of luminance variation is not biased, image shift detection can be made with a high precision no matter in which direction the subject is moved. Therefore, comparing these two subject images, the subject image of FIG. 2B is more suitable for image shift detection than that of FIG. 2A.

Thus, even if the sharpness or contrast of a subject image is sufficient, some subject images are suitable but others are not suitable for image shift detection according to the configuration of the subject image, in particular, the direction of luminance variation (contrast). On the contrary, in the above-mentioned prior arts, since the detection area is selected merely based on the magnitude of the sharpness or contrast, a part receiving a subject image not suitable for image shift detection may be selected.

SUMMARY OF THE INVENTION

An object of the present invention is to provide a camera having an image shift detecting function which detects an image shift by estimating the image shift detection precision with the direction of luminance variation of a subject image formed on a light receiving surface of a solid-state image sensing device for detecting an image shift and by using only a partial area of the solid-state image sensing device which is estimated to have a sufficiently high detection precision.

To achieve the above-mentioned object, according to the present invention, a camera having an image shift detecting function is provided with an optical system which forms a subject image; an image sensing device which receives the subject image formed by the optical system to convert the subject image into an electric signal; image shift detecting means for detecting a relative shift between a camera body and a subject based on an output of the image sensing device; luminance variation direction detecting means for detecting a direction of luminance variation of the subject image based on the output of the image sensing device; selecting means for selecting a partial area of the image sensing device based on an output of the luminance variation direction detecting means; and controlling means for controlling the image shift detecting means to detect an image shift by using only an output corresponding to the partial area of the image sensing device selected by the selecting means.

According to such features, since in addition to the conventionally-used contrast, the direction of luminance variation of a subject image formed on the light receiving surface of an image sensing device is used to estimate the detection precision of a solid-state image sensing device which detects an image shift, the detection precision is more correctly estimated compared to the above-described prior arts. In addition, by detecting an image shift by using only a partial area of the solid-state image sensing device where the detection precision is sufficiently high, the image shift detection is more precisely made with a smaller amount of calculation.

BRIEF DESCRIPTION OF THE DRAWINGS

This and other objects and features of this invention will become clear from the following description, taken in conjunction with the preferred embodiments with reference to the accompanied drawings in which:

FIGS. 10A and 10B are schematic views of assistance in explaining a calculation to calculate a single data from a plurality of pixels;

FIG. 35 is a schematic view showing how a change-with-time compensation coefficient is obtained;

DESCRIPTION OF THE PREFERRED EMBODIMENTS

Figure 1:
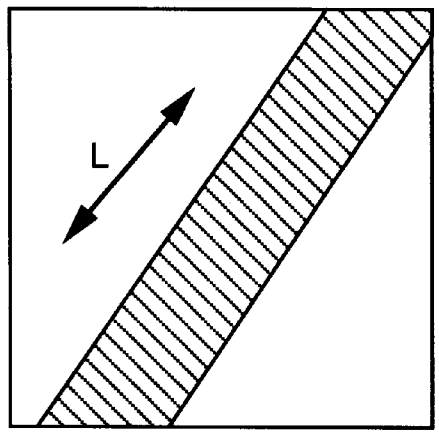
FIG. 1 shows a subject image to explain the selection of a detection area.
Figure 2A:
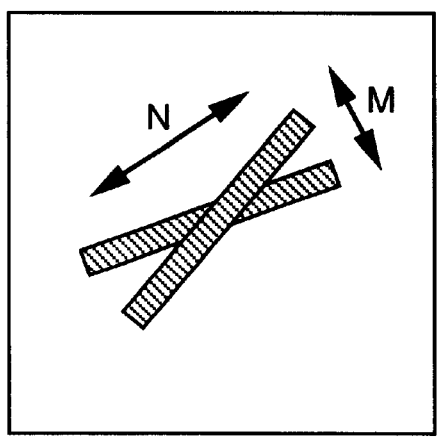
FIGS. 2A and 2B show subject images to explain the selection of a detection area.
Figure 2B:
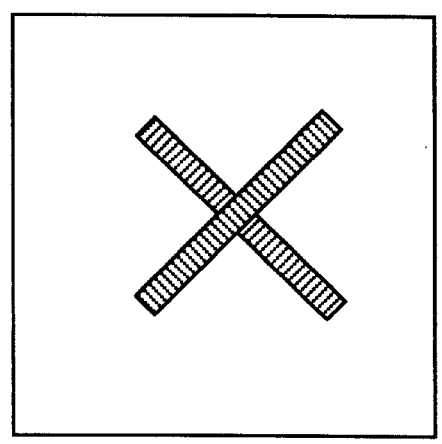
Figure 3:
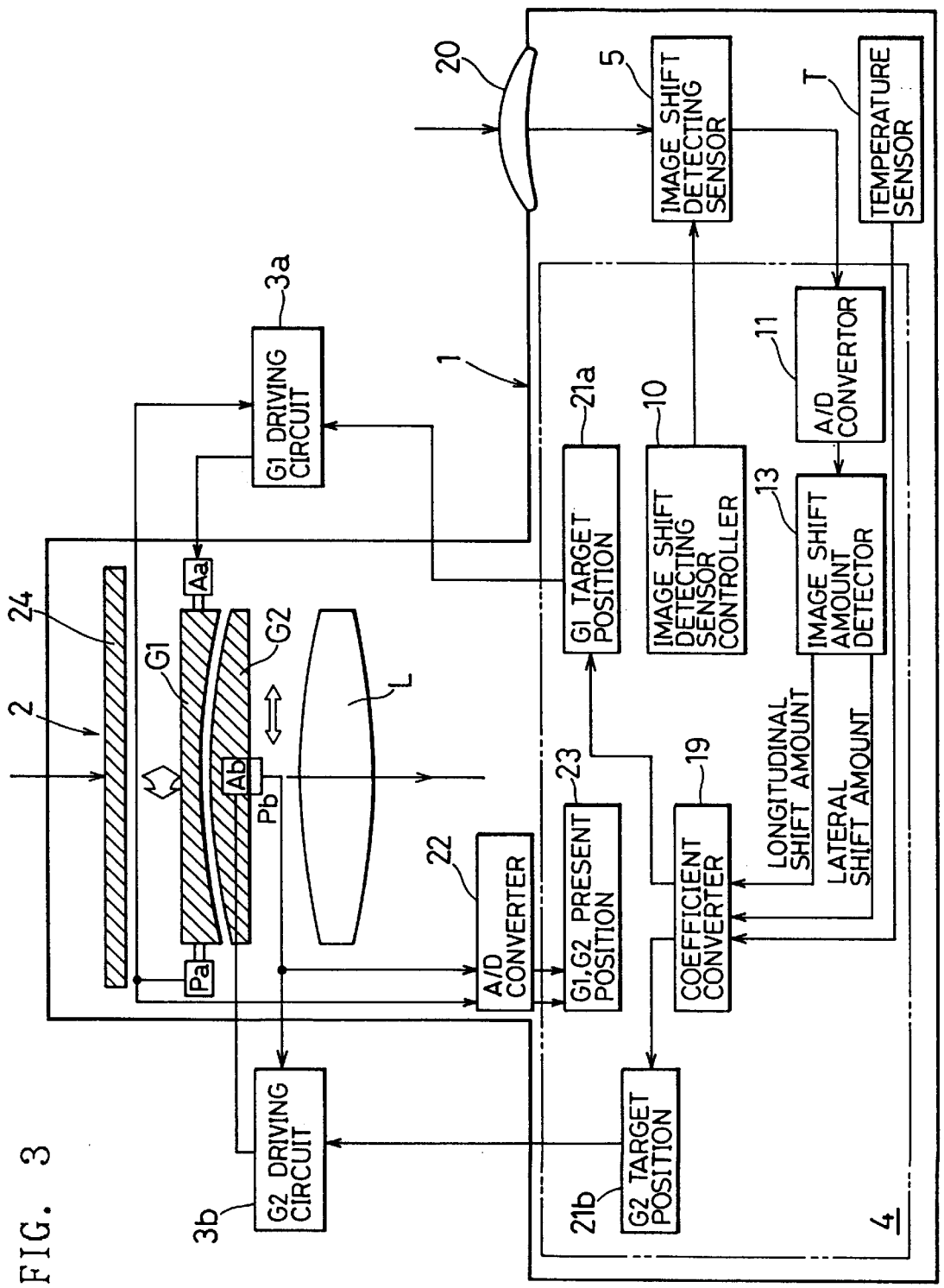
FIG. 3 is a block diagram schematically showing the general arrangement of a camera shake compensating system in an embodiment of a camera having an image shift detecting function according to the present invention.

Hereinafter, an embodiment of the present invention will be described with reference to the drawings. Referring to FIG. 3, there is shown the general arrangement of a camera shake compensating system according to the embodiment of the present invention. As shown in the figure, the camera system of this embodiment includes in a camera body 1 an optical system 2 for forming a subject image, driving circuits 3a and 3b which drive compensating lenses G1 and G2 provided in the optical system 2, an image shift detecting system which detects the amount of a relative shift between the camera body 1 and the subject image, and a microcomputer 4 which controls the driving circuits 3a and 3b to compensate for the relative shift between the camera body 1 and the subject image based on the amount of longitudinal and lateral image shifts supplied from the image shift detecting system.

Figure 4:
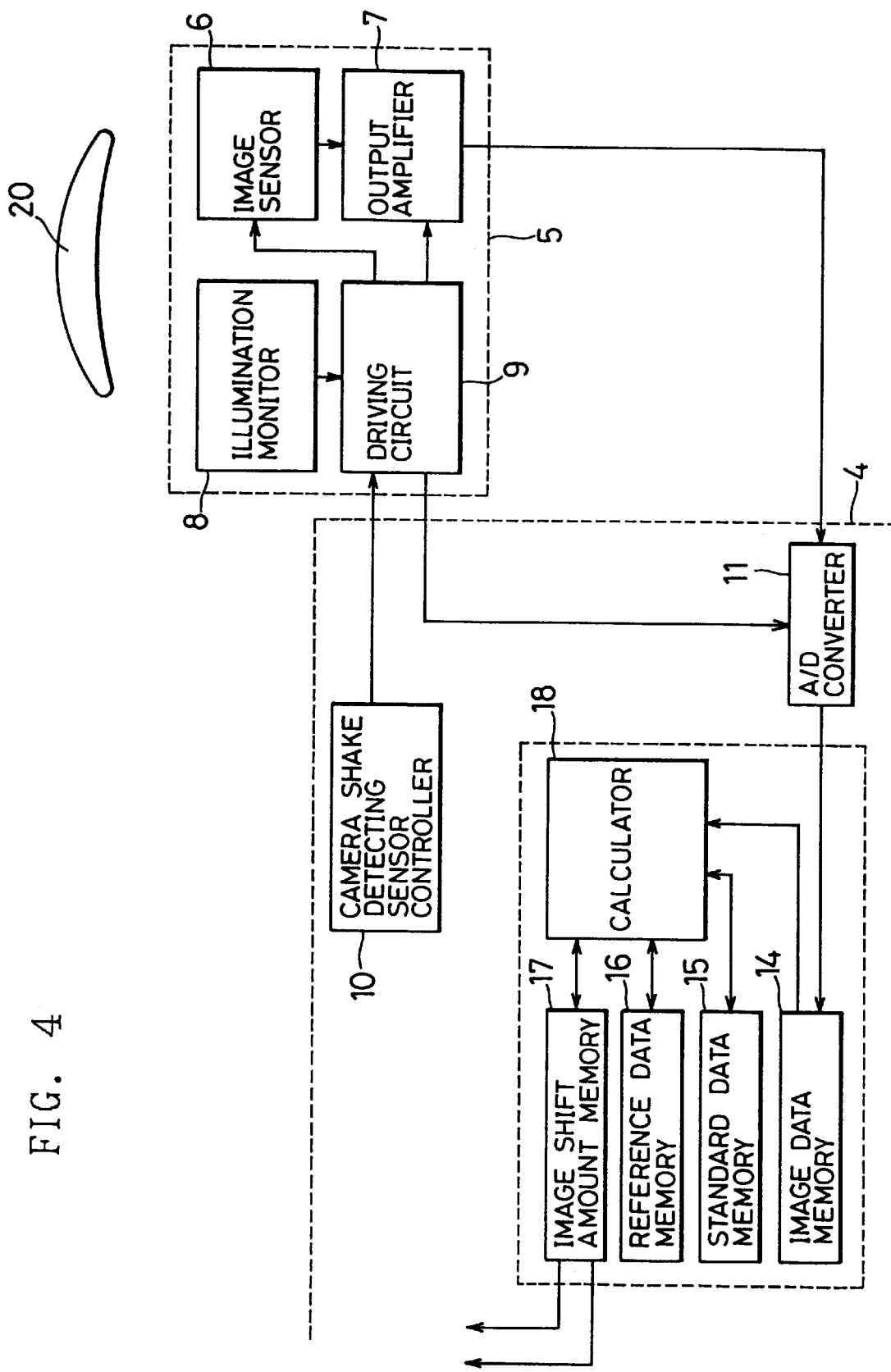
FIG. 4 is a block diagram schematically showing the arrangement of an image shift detecting system.

The details of the image shift detecting system will be described with reference to FIGS. 4 to 14. Referring to FIG. 4, an image shift detecting sensor 5 is an area sensor including an image sensor 6 which accumulates optical image information on its light receiving surface to convert it into an electric signal, an output amplifier 7 which amplifies the electric signal outputted from the image sensor 6, an illuminance monitor 8 for controlling the accumulation time of the image sensor 6 and the gain of the output amplifier 7, and a driving circuit 9.

The light receiving surface of the image sensor 6 is constituted by I×J pixels, and K×L detection blocks constituted by (M+4)×(N+4) adjoining pixels are set thereon. The driving circuit 9 controls the accumulation time of the image sensor 6 according to an output of the illuminance monitor 8 or a control signal from an image shift detecting sensor controller 10, controls the gain of the output amplifier 7 according to an output of the illuminance monitor 8, and supplies a clock to the image sensor 6 and an analog-to-digital (AID) converter 11 according to a control signal from the image shift detecting sensor controller 10.

A detecting system lens 20 is a fixed focal length lens with a focal length fd and forms a subject image on the light receiving surface of the image shift detecting sensor 5. An electric signal (subject image information) outputted from the image shift detecting sensor 5 is inputted to the A/D converter 11 to be converted into a digital two-dimensional image data and then inputted to an image shift amount detector 13. The image shift amount detector 13 includes an image data memory 14, a standard data memory 15, a reference data memory 16, an image shift amount memory 17 and a calculator 18. The inputted image data are stored in the image data memory 14.

The calculator 18 extracts a standard data or a reference data from the image data stored in the image data memory 14 to store it in the standard data memory 15 or the reference data memory 16 and performs predetermined comparison calculation and estimation calculation to calculate the shift amount (image shift amount) with time of the subject image formed on the light receiving surface of the image shift detecting sensor 5. The detected image shift amount (including longitudinal and lateral image shift amounts) is stored in the image shift amount memory 17 and transferred to a coefficient converter 19 shown in FIG. 3.

Figure 5:
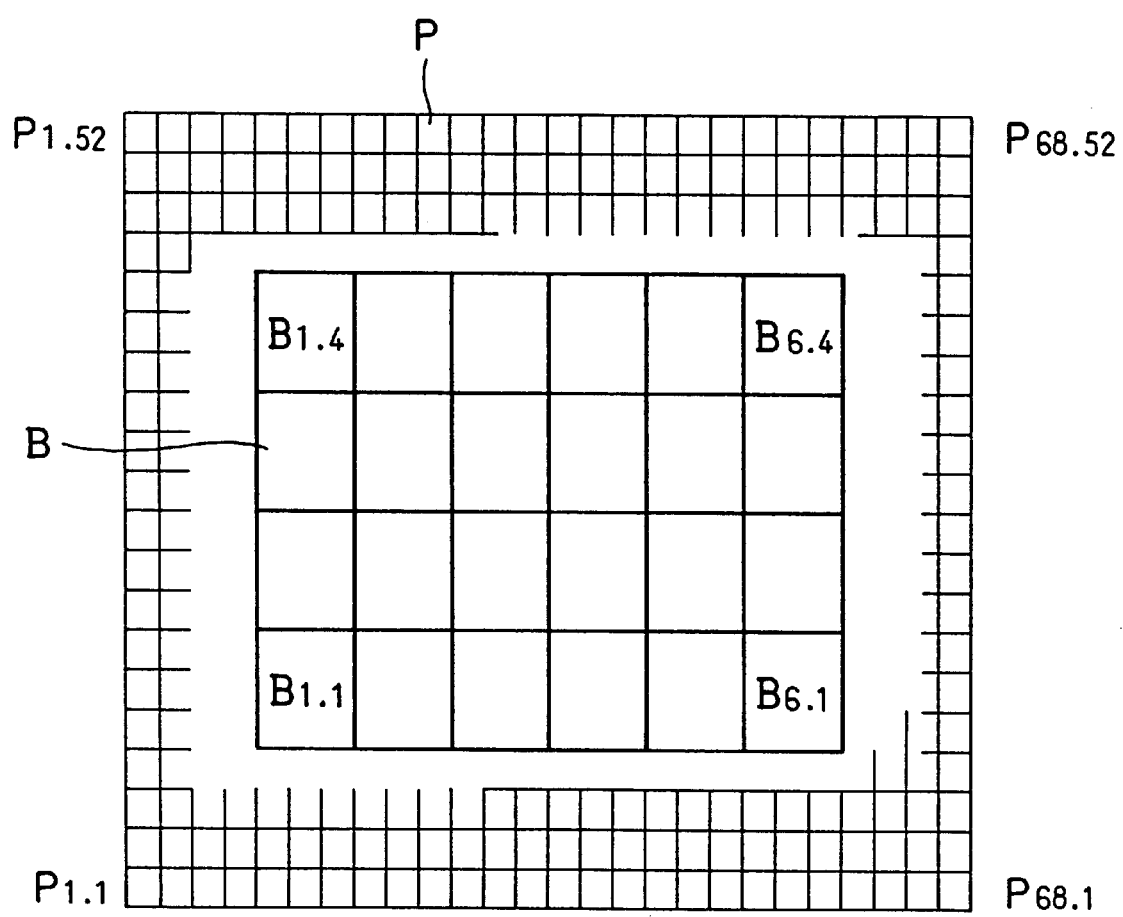
FIG. 5 is a schematic view showing a light receiving surface of an image shift detecting sensor.

Subsequently, an image shift detecting method will be described. In this embodiment, I=68, J=52, M=4, N=4, K=6 and L=4. Referring to FIG. 5, there is schematically shown the light receiving surface of the image shift detecting sensor 5. The smaller squares represent pixels P and the squares enclosed by thick lines represent detection blocks B. In the figure, the block at the lower left end is represented as $B_{1,1}$; the block at the upper right end, as $B_{6,4}$; the pixel at the lower left end, as $P_{1,1}$; and the pixel at the upper right end, as $P_{68,52}$. The block $B_{k,e}$ ($1 \leq k \leq 6$, $1 \leq e \leq 4$) includes 8×8 adjoining pixels $P_{i,j}$ (8×(k−1)+11 ≤ i 8×(k−1)+18, 8×(e−1)+11 ≤ j ≤ 8×(e−1)+18).

The summary of the image shift detection is as follows: (i) The accumulation of the subject image (first time) is performed by the image shift detection sensor 5. Then, the output is A/D converted and a digital image data obtained by the A/D conversion is stored in the memory 14. (ii) Calculation is performed to determine the suitability as the standard data for each block by using the image data stored in the image data memory 14. When there is a suitable block, the data is extracted as the standard data and stored in the standard data memory 15. When there is no suitable block, the process returns to the above (i).

(iii) The accumulation of the subject image (second and succeeding times) is performed by the image shift detecting sensor 5. Then, the output is A/D converted and the digital image data obtained by the A/D conversion is stored in the image data memory 14. (iv) A reference data is extracted from the image data stored in the image data memory 14 and stored in the reference data memory 16. Then, the image shift amount of the reference data in view of the standard data is calculated and stored in the image shift amount memory 17.

(v) By using a plurality of image shift amount data stored in the image shift amount memory 17, image shift amount calculation and (image shift amount) estimation calculation to compensate for an image shift compensation time lag generated by the driving of the compensating lenses G1 and G2 are performed. (vi) The calculated (estimation) image shift amount is stored in the image shift amount memory 17 and transferred to the coefficient converter 19. (vii) The process returns to the above (iii).

The calculation processing performed by the calculator 18 includes the following: (i) image shift amount calculation; (ii) image data processing; (iii) selection of a detection block (extraction of a standard data); (iv) extraction of a reference data; and (v) (image shift amount) estimation calculation. These will subsequently be described.

(1) Image Shift Amount Calculation

Figure 6B:
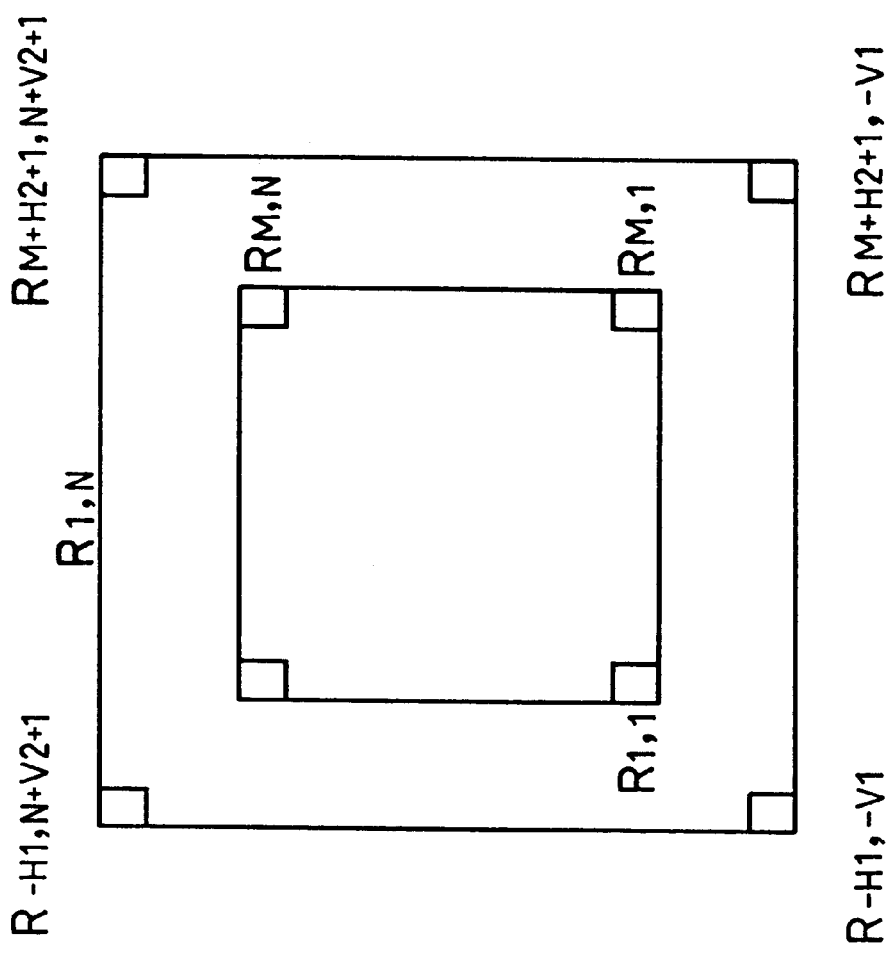
FIG. 6B is a schematic view showing image data of reference data.
Figure 6A:
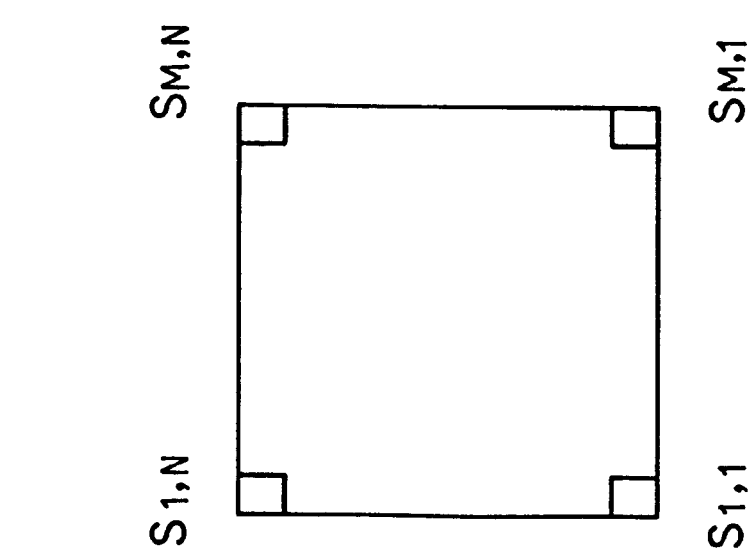
FIGS. 6A is a schematic view showing image data of standard data.

Here, an example using a standard data constituted by an image data $S_{m,n}$ (m and n are integers, $1 \leq m \leq M$, $1 \leq n \leq N$) including M×N pixels and a reference data constituted by an image data $R_{m,n}$ (m and n are integers, $-H1 \leq m \leq M+H2+1$, $-V1 \leq n \leq N+V2+1$) including (M+H1+H2+2)×(N+V1+V2+2) pixels will be described with reference to FIGS. 6A and 6B. A standard data $S_{1,1}$ shown in FIG. 6A and a reference data $R_{-H1,-V1}$ shown in FIG. 6B are image data corresponding to the pixel at the lower left end. A standard data $S_{M,N}$ and a reference data $R_{M+H2+1,N+V2+1}$ are image data corresponding to the pixel at the upper left end.

The image shift amount on the light receiving surface of the image shift detecting sensor 5 is represented as (x, y) using a lateral image shift amount x (in the figure, leftward direction is positive) and a longitudinal image shift amount y (upward direction is positive) with the length of one side of a pixel as a unit. When the standard data $S_{m,n}$ ($1 \leq m \leq M$, $1 \leq n \leq N$) and a part of the reference data $R_{m,n}$ (x+1 ≤ m ≤ x+M, y+1 ≤ n ≤ N, x and y are integers, $-H1-e \leq x \leq H2+1$, $-V1-e \leq y \leq V2+1$) coincide with each other, the image shift amount of the reference data in view of the standard data is (x, y).

$$H(x, y) = \sum_{m=1}^{M} \sum_{n=1}^{N} |S_{m,n} - R_{m+x,n+y}| \qquad \text{Expression 1}$$

where x and y are integers, $-H1-e \leq x \leq H2+1$, and $-V1-e \leq y \leq V2+1$.

Further, as a value representative of the degree of coincidence between the standard data and the reference data, a correlation value is defined by the above expression 1. Specifically, when $H(x_0, y_0)=0$, the image shift amount is $(x_0, y_0)$. The farther x is away from $x_0$ and the farther y is away from $y_0$, the greater the correlation value $H(x, y)$ is.

Figure 7:
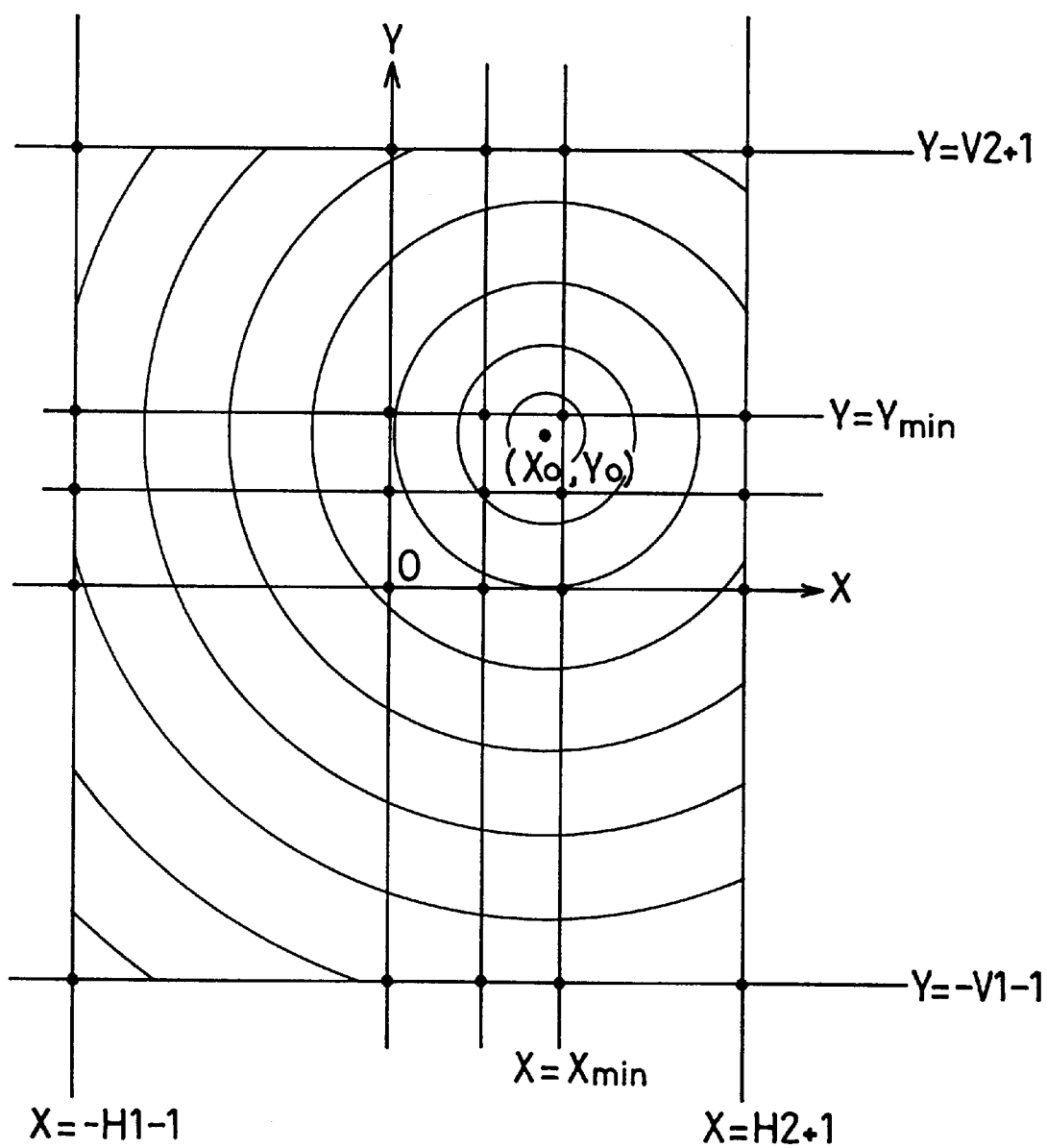
FIG. 7 is a schematic view showing the distribution of image shift amount correlation values represented by contour lines.

Referring to FIG. 7, there are shown contour lines representing the distribution of the correlation value $H(x, y)$ when the image shift amount is $(x_0, y_0)$. While in actuality, correlation values are obtained only at the lattice points in the figure since x and y are integers, assuming that correlation values are present between the lattices, the points where the correlation values equal each other are connected to form the contour lines.

In FIG. 7, while the correlation value $H(x_0, y_0)$ which does not really exist is assumed to be 0, a correlation value $H(x_{min}, y_{min})$ at a lattice point $(x_{min}, y_{min})$ closest to the coordinate $(x_0, y_0)$ is considered to be the minimum of existing correlation values. Specifically, by calculating the correlation value $H(x, y)$ with respect to the integers x and y of $-H1-e \leq x \leq H2+1$, $-V1-e \leq y \leq V2+1$ to find the minimum value $H(x_{min}, y_{min})$, an approximate value $(x_{min}, y_{min})$ of the image shift amount $(x_0, y_0)$ is obtained. This calculation is called a correlation calculation.

Subsequently, an interpolation calculation will be described. The interpolation calculation is a calculation to find a coordinate $(x_0, y_0)$ where the correlation value is estimated to be 0, for example, by using only the correlation values at the lattice points of FIG. 7. Only by the correlation calculation, only the approximate value $(x_{min}, y_{min})$ of the image shift amount $(x_0, y_0)$ can be calculated and it is impossible to detect and compensate for an image shift with a high precision. The interpolation calculation is indispensable for such high-precision image shift detection and compensation.

Assume that $R_{min}$ $(x_{min}+1 \leq m \leq M+x_{min}, y_{min}+1 \leq n \leq N+y_{min})$ is obtained through the above-described correlation calculation as the approximate value $(x_{min}, y_{min})$ of the image shift amount, in other words, as a portion of the reference data which more accurately coincides with the standard data. For the interpolation calculation, a reference data $R_{min}(x_{min} \leq m \leq M+x_{min}+1, y_{min} \leq n \leq N+y_{min}+1)$ of a slightly wider range is necessary. For this reason, $-H1 \leq x_{min} \leq H2$, $-V1 \leq y_{min} \leq V2$, so that in the correlation calculation, the correlation value $H(x, y)$ is calculated with respect to the integers x and y of $-H1 \leq x \leq H2$ and $-V1 \leq y \leq V2$.

By using these image data, first, a coordinate $(x_v, y_{min}+v)$ is calculated where the correlation value is estimated to be minimum on a straight line $y=y_{min}+v$ ($v=-1, 0, 1$). To do so, an expression 2 shown below is defined as a new correlation value. Then, a correlation value $Hx_0(x, y_{min}+v)$ is calculated with respect to $x=x_{min}-1, x_{min}, x_{min}+1$ to obtain the minimum value $Hx_0(x_{minv}, y_{min}+v)$. Then, a total of three data are calculated by an expression 3 shown below. Then, an interpolation calculation on the straight line $y=y_{min}+v$ is performed by an expression 4 shown below to calculate the value of $x_v$, thereby calculating a coordinate $(x_v, y_{min}+v)$ where the correlation value is estimated to be minimum on the straight line $y=y_{min}+v$.

$$Hx_0(x, y) = \sum_{n=1}^{N} \left( \frac{|S_{1,n} - R_{1+x,n+y}|}{2} + \sum_{m=2}^{M-1} |S_{m,n} - R_{m+x,n+y}| + \frac{|S_{M,n} - R_{M+x,n+y}|}{2} \right)$$
Expression 2

$$Hx_{-1}(x, y) = \sum_{n=1}^{N} \sum_{m=2}^{M} |S_{m,n} - R_{m+x-1,n+y}|$$

$$Hx_1(x, y) = \sum_{n=1}^{N} \sum_{m=2}^{M-1} |S_{m,n} - R_{m+x+1,n+y}|$$

where
$x_{min} - 1 \leq x \leq x_{min} + 1$, $y_{min} - 1 \leq y \leq y_{min} + 1$.

$H_{-1} = Hx_{-1}(x_{minv}, y_{min} + v)$  Expression 3
$H_0 = Hx_0(x_{minv}, y_{min} + v)$
$H_1 = Hx_1(x_{minv}, y_{min} + v)$ When $H_{-1} \leq H_1$, $x_v = x_{minv} + \frac{1}{2} \times \frac{H_{-1} - H_1}{H_1 - H_0}$  Expression 4

When $H_{-1} > H_1$, $x_v = x_{minv} + \frac{1}{2} \times \frac{H_{-1} - H_1}{H_{-1} - H_0}$ Then, a coordinate $(x_{min}+h, y_h)$ where the correlation value is estimated to be minimum on a straight line $x=x_{min}+h$ ($h=-1, 0, 1$) is calculated. To do so, Hy is defined by an expression 5 shown below in a similar manner to Hx. Then, a correlation value $Hy_0(x_{min}+h, y)$ is calculated with respect to $y=y_{min}-1$, $y=y_{min}$, $y=y_{min}+1$ to obtain the minimum value $Hy_0(x_{min}+h, y_{minh})$.

$$Hy_0(x, y) = \sum_{m=1}^{M} \left( \frac{|S_{m,1} - R_{m+x,1+y}|}{2} + \sum_{n=2}^{N-1} |S_{m,n} - R_{m+x,n+y}| + \frac{|S_{m,n} - R_{m+x,N+y}|}{2} \right)$$
Expression 5

$$Hy_{-1}(x, y) = \sum_{m=1}^{M} \sum_{n=2}^{N} |S_{m,n} - R_{m+x,n+y-1}|$$

$$Hy_1(x, y) = \sum_{m=1}^{M} \sum_{n=2}^{N-1} |S_{m,n} - R_{m+x,n+y+1}|$$

where $x_{min} - 1 \leq x \leq x_{min} + 1$, $y_{min} - 1 \leq y \leq y_{min} + 1$.

$H_{-1} = Hy_{-1}(x_{min} + h, y_{minh})$  Expression 6
$H_0 = Hy_0(x_{min} + h, y_{minh})$
$H_1 = Hy_1(x_{min} + h, y_{minh})$ When $H_{-1} \leq H_1$, $y_h = y_{minh} + \frac{1}{2} \times \frac{H_{-1} - H_1}{H_1 - H_0}$  Expression 7

Figure 8:
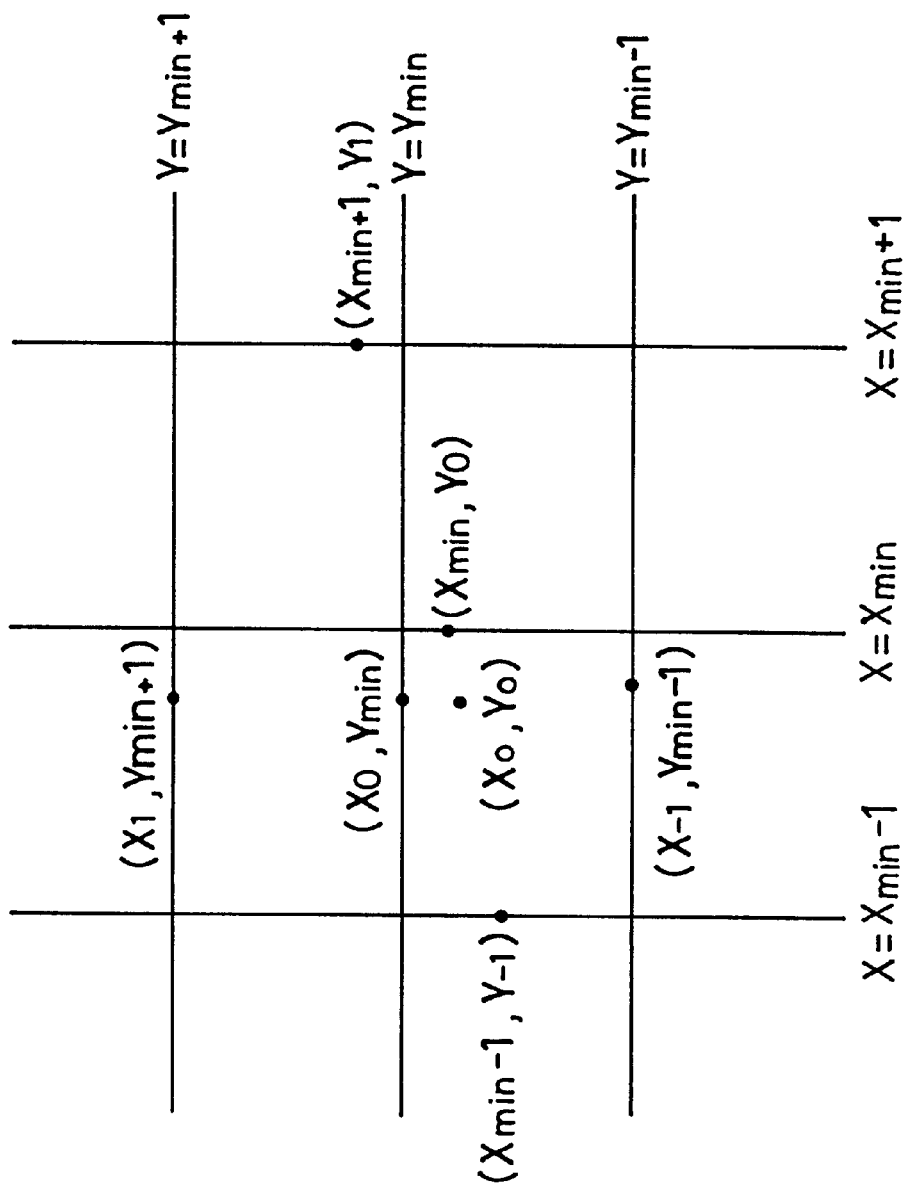
FIG. 8 is a schematic view showing coordinates obtained through a one-dimensional interpolation calculation.
Figure 9A:
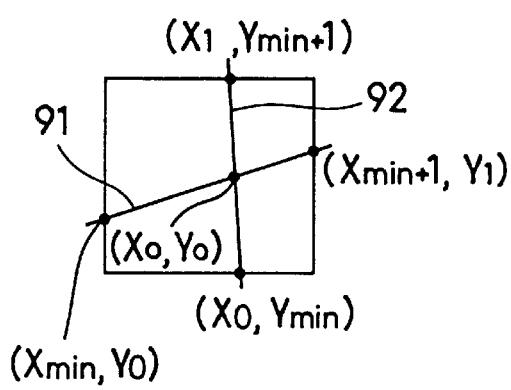
FIGS. 9A to 9D are schematic views of assistance in explaining a two-dimensional interpolation calculation.
Figure 9B:
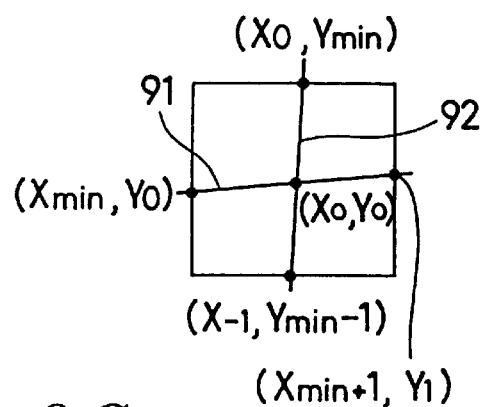
Figure 9C:
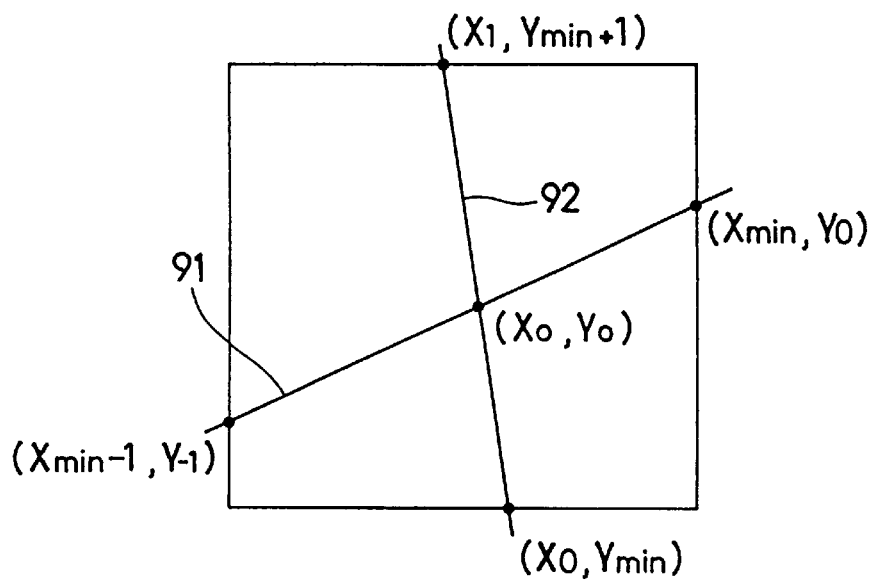
Figure 9D:
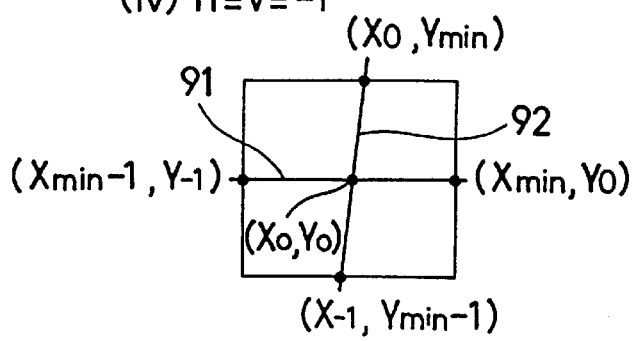

When $H_{-1} > H_1$, $y_h = y_{minh} + \frac{1}{2} \times \frac{H_{-1} - H_1}{H_{-1} - H_0}$ Then, a total of six data are calculated by the above expression 6. Then, by using the above expression 7, an interpolation calculation on the straight line $x=x_{min}+h$ is performed to calculate the value of $y_h$, thereby calculating a coordinate ($x_{min}$+h, $y_h$) where the correlation value is estimated to be minimum on the straight line x=$x_{min}$+h. By the above-described correlation calculation, as shown in FIG. 8, the coordinates ($x_{-1}$, $y_{min}$−1), ($x_0$, $y_{min}$), ($x_1$, $y_{min}$+1), ($x_{min}$−1, $y_{-1}$), ($x_{min}$, $y_0$) and ($x_{min}$+1, $y_1$) where the correlation values are estimated to be minimum on six straight lines are obtained.

Subsequently, a two-dimensional interpolation calculation will be described with reference to FIGS. 9A to 9D. The coordinate ($x_0$, $y_0$) where the correlation value is estimated to be zero is present in an area surrounded by four straight lines x=$x_{min}$, x=$x_{min}$+h, y=$y_{min}$, y=$y_{min}$+v (h=±1, v=±1). The coordinates where the correlation value is minimum on the straight lines are ($x_{min}$, $y_0$), ($x_{min}$+h, $y_h$), ($x_0$, $y_{min}$) and ($x_v$, $y_{min}$+v), respectively.

It is assumed here that a straight line 91 passing the coordinates ($x_{min}$, $y_0$) and ($x_{min}$+h, $y_h$) and a straight line 92 passing the coordinates ($x_0$, $y_{min}$) and ($x_v$, $y_{min}$+v) pass the vicinity of the coordinate ($x_0$, $y_0$), and approximately, the point of intersection of the two straight lines 91 and 92 coincides with the coordinate ($x_0$, $y_0$). The approximate values of $x_0$ and $y_0$ are obtained by an expression 9 shown below by using the coordinate of the point of intersection of the straight lines 91 and 92 by an expression 8 shown below:

$$\text{Straight line 91: } y = \frac{y_h - y_0}{h \times (x - x_{\min}) + y_0} \qquad \text{Expression 8}$$

$$\text{Straight line 92: } y = \frac{v}{(x_v - x_0) \times (x - x_0) + y_{\min}}$$

$$x_0 \approx x_{\min} + \frac{x_0 - x_{\min} + (y_0 - y_{\min}) \times \frac{x_v - x_0}{v}}{1 - \frac{x_v - x_0}{v} \times \frac{y_h - y_0}{h}} \qquad \text{Expression 9}$$

$$y_0 \approx y_{\min} + \frac{y_0 - y_{\min} + (x_0 - x_{\min}) \times \frac{y_h - y_0}{h}}{1 - \frac{x_v - x_0}{v} \times \frac{y_h - y_0}{h}}$$

Since the coordinate ($x_0$, $y_0$) thus calculated should exist in an area surrounded by the four straight lines x=$x_{min}$, x=$x_{min}$+h, y=$y_{min}$, y=$y_{min}$+v (h=±1, v=±1):

when h=1, $x_{min} \leq x_0 \leq x_{min}+1$ should be fulfilled;
when h=−1, $x_{min}-1 \leq x_0 \leq x_{min}$ should be fulfilled;
when v=1, $y_{min} \leq y_0 \leq y_{min}+1$ should be fulfilled; and
when v=−1, $y_{min}-1 \leq y_0 \leq y_{min}$ should be fulfilled.

Therefore, it is assumed that the calculation of the coordinate ($x_0$, $y_0$) is impossible when these are not fulfilled.

Returning to FIG. 8, when the six coordinates ($x_{-1}$, $y_{min}$−1), ($x_0$, $y_{min}$), ($x_1$, $y_{min}$+1), ($x_{min}$−1, $y_{-1}$), ($x_{min}$, $y_0$) and ($x_{min}$+1, $y_1$) are present, the following four combinations are obtained as shown in FIGS. 9A to 9D:

(i) h=v=1;
(ii) h=1, v=−1;
(iii) h=−1, v=1; and
(iv) h=v=−1.

In this case, the coordinate ($x_0$, $y_0$) is calculated for each of (i) to (iv). When the coordinate ($x_0$, $y_0$) cannot be calculated for all of the four, the calculation of the coordinate ($x_0$, $y_0$) is impossible. When the coordinate ($x_0$, $y_0$) can be calculated for one of the four, the calculated coordinate is the coordinate ($x_0$, $y_0$). When the coordinate ($x_0$, $y_0$) can be calculated for some of the four, the coordinate ($x_0$, $y_0$) is the average of the calculated coordinates. The image shift amount ($x_0$, $y_0$) of the reference data in view of the standard data is thus calculated with a high precision.

(2) Image Data Processing

The two-dimensional image data obtained by A/D converting the output of the image shift detecting sensor 5 includes low-frequency components and noise components which degrade the precision of the image shift amount calculation. Therefore, to enable a highly precise image shift detection, it is necessary to perform a specific calculation processing of the image data stored in the image data memory 14 to reduce the components which can degrade the calculation precision.

In this embodiment, as shown in FIG. 10A, one processing data $G_{i,j}$ is calculated by using image data $D_{i,j-1}$, $D_{i-1,j}$, $D_{i,j}$, $D_{i+1,j}$ and $D_{i,j+1}$ corresponding to four adjoining pixels $P_{i,j-1}$, $P_{i-1,j}$, $P_{i,j}$, $P_{i+1,j}$ and $P_{i,j+1}$.

For example, as shown in FIG. 10B, by performing a specific calculation processing (image data processing) of the image data $D_{i,j}$ (8×(k−1)+11≦i≦8×(k−1)+18, 8×(e−1)+11≦j≦8×(e−1)+18) of the block $B_{k,1}$ constituted by 8×8 adjoining pixels $P_{i,j}$, 6×6 processing data $G_{i,j}$ (8×(k−1)+12≦i≦8×(k−1)+17, 8×(e−1)+12≦j≦8×(e−1)+17) are obtained. In this case, the image data corresponding to the pixels at the four corners of the block $B_{k,1}$ are not used.

As the operation expression, an expression such as an expression 10 shown below is used. By such an image data processing, the components which can degrade the calculation precision are reduced, so that a highly precise image shift detection is enabled.

$$G_{i,j} = \frac{D_{i,j-1} + D_{i-1,j} - D_{i+1,j} - D_{i,j+1}}{D_{i,j-1} + D_{i-1,j} + D_{i,j} + D_{i+1,j} + D_{i,j+1}} \qquad \text{Expression 10}$$

(3) Selection of Detection Block (Extraction of Standard Data)

In this embodiment, 6×4 detection blocks are set on the light receiving surface of the image shift detecting sensor 5. A calculation to determine the suitability as the standard data is performed for each block to select a suitable block as the standard data. Thereby, only a block superior in image shift amount calculation precision is selected, so that a high calculation precision is obtained with a small amount of calculation. By providing a plurality of detection blocks, in other words, by providing a wide image shift detection area, the probability of the presence of a block superior in image shift amount calculation precision increases, so that a more highly precise image shift detection is enabled.

The suitability as the standard data, i.e. the superiority or inferiority in the image shift amount calculation precision will be described by using as an example a standard data constituted by an image data $S_{m,n}$ (m and n are integers, 1≦m≦M, 1≦n≦N). As a factor to determine the superiority or inferiority in the calculation accuracy, contrast is considered. Therefore, a lateral contrast HC and a longitudinal contrast VC of the standard data are defined by an expression 11 shown below. In a standard data having high contrasts HC and VC, the correlation values in the image shift calculation are also high. For this reason, such a standard data is not readily affected by the noise components included in the image data, so that the calculation precision is high.

$$HC = \sum_{m=1}^{M-1} \sum_{n=1}^{N} |S_{m,n} - S_{m+1,n}| \qquad \text{Expression 11}$$

-continued $$VC = \sum_{m=1}^{M} \sum_{n=1}^{N-1} |S_{m,n} - S_{m,n+1}|$$

Further, as a factor to determine the superiority or inferiority in the two-dimensional interpolation calculation precision of the image shift amount calculation, an angle is considered at which the straight line 91 passing the coordinates ($x_{min}$, $y_0$) and ($x_{min}$+h, $y_h$) and the straight line 92 passing ($x_0$, $y_{min}$) and ($x_v$, $y_{min}$+v) intersect each other. It is considered that the calculation precision is the highest when the two straight lines intersect at 90°. In that case, (Inclination of straight line 91)×(Inclination of straight line 92)=−1

This is modified into $$\frac{y_h - y_0}{h} + \frac{x_v - x_0}{v} = 0$$

The left member of this expression is expressed by A (h, v). The smaller |A(h, v)| is, the closer to 90° the angle at which the two straight lines intersect and the higher the calculation precision is. Further, as a factor to determine the superiority and inferiority in the calculation precision, the sum total of |A(h, v)|:

A=|A(1, 1)|+|A(1, −1)|+|A(−1,1)|+|A(−1, −1)| is defined.

To simulatively calculate the factor A by using only the standard data, a self-correlation calculation based on the standard data is performed. For this calculation, a data $S_{m,n}$ (m and n are integers, $0 \leq m \leq M+1$, $0 \leq n \leq N+1$) of a slightly wider range is necessary. In this case, the image data of a detection block constituted by (M+4)×(N+4) adjoining pixels is converted into (M+2)×(N+2) processing data by the image data processing. By using the processing data, the calculation to determine the suitability as the standard data is performed. When the processing data are determined to be suitable as the standard data, M×N data of the processing data are extracted as the standard data.

The self-correlation calculation based on the standard data will be described. First, a coordinate ($x_v$, v) where the correlation value is estimated to be minimum on the straight line y=v (v=±1) is calculated. To do so, as a new correlation value, Sx is defined from an expression 12 shown below. Then, a correlation value $Sx_0(x, y)$ is calculated with respect to x=−1, 0, 1 to obtain the minimum value $Sx_0(x_{minv}, v)$.

$$Sx_0(x, y) = \sum_{n=1}^{N} \left( \frac{|S_{1,n} - S_{1+x,n+y}|}{2} + \right.$$

$$\left. \sum_{m=2}^{M-1} |S_{m,n} - S_{m+x,n+y}| + \frac{|S_{M,n} - S_{M+x,n+y}|}{2} \right)$$
Expression 12

$$Sx_{-1}(x, y) = \sum_{n=1}^{N} \sum_{m=2}^{M} |S_{m,n} - S_{m+x-1,n+y}|$$

$$Sx_1(x, y) = \sum_{n=1}^{N} \sum_{m=1}^{M-1} |S_{m,n} - S_{m+x+1,n+y}|$$

where −1 ≤ x ≤ 1, y = ±1

Then, three data are calculated by an expression 13. Then, an interpolation calculation on the straight line y=v is performed by an expression 14 to calculate $x_v$. When the correlation value becomes minimum on the straight line y=v, an estimated coordinate ($x_v$, v) is calculated.

$$S_{-1} = Sx_{-1}(x_{minv}, v)$$ Expression 13

$$S_0 = Sx_0(x_{minv}, v)$$

$$S_1 = Sx_1(x_{minv}, v)$$

When $S_{-1} \leq S_1$, $x_v = x_{minv} + \frac{1}{2} \times \frac{S_{-1} - S_1}{S_1 - S_0}$ Expression 14

When $S_{-1} > S_1$, $x_v = x_{minv} + \frac{1}{2} \times \frac{S_{-1} - S_1}{S_{-1} - S_0}$ Then, a coordinate (h, $y_h$) where the correlation value is estimated to be minimum on the straight line x=h (h=±1) is calculated. To do so, like the case of Sx, Sy is defined by an expression 15 shown below. Then, a correlation value $Sy_0$(h, y) is calculated with respect to y=−1, 0, 1 to obtain the minimum value $Sy_0$(h, $y_{minh}$)

Then, three data are calculated by an expression 16 shown below. Then, an interpolation calculation on the straight line x=h is performed by using an expression 17 shown below to calculate a coordinate (h, $y_h$) where the correlation value is estimated to be minimum on the straight line x=h.

Figure 11:
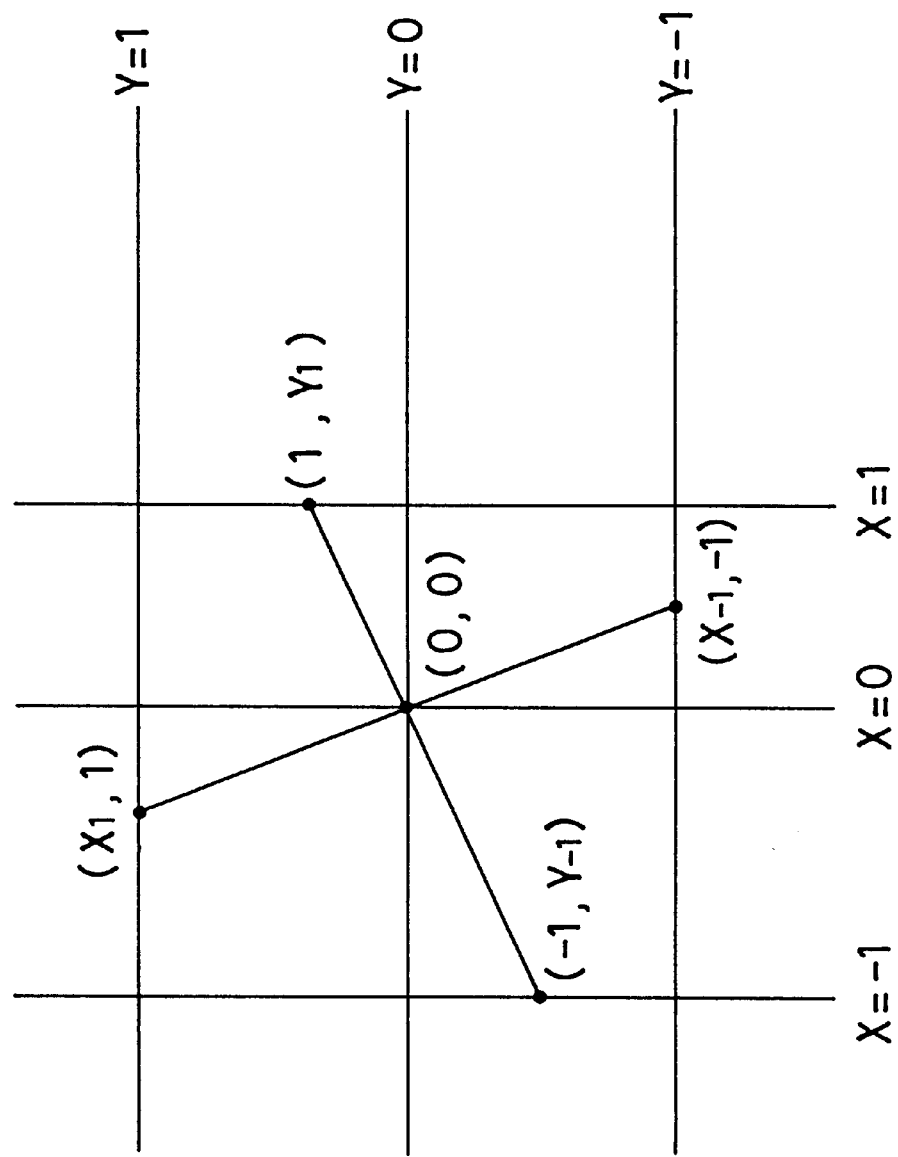
FIG. 11 is a schematic view of assistance in explaining a calculation to simulatively calculate coordinates of two lines through a self-correlation calculation using only the standard data.

The coordinate where the correlation value on straight lines x=0 and y=0 is (0, 0), and $x_0=y_0=0$. Thus, by the self-correlation calculation using only the standard data, $x_{-1}$, $x_0$, $x_1$, $y_{-1}$, $y_0$ and $y_1$ are simulatively calculated as shown in FIG. 11. By using these, the factor A to determine the superiority and inferiority in the two-dimensional interpolation calculation precision is expressed as A=|$y_1$+$x_1$|+|$y_1$−$x_1$|+|$y_{-1}$−$x_1$|+|$y_{-1}$+$x_{-1}$|

$$Sy_0(x, y) = \sum_{m=1}^{M} \left( \frac{|S_{m,1} - S_{m+x,1+y}|}{2} + \right.$$
Expression 15

$$\left. \sum_{n=2}^{N-1} |S_{m,n} - S_{m+x,n+y}| + \frac{|S_{m,N} - S_{m+x,N+y}|}{2} \right)$$

$$Sy_{-1}(x, y) = \sum_{m=1}^{M} \sum_{n=2}^{N} |S_{m,n} - S_{m+x,n+y-1}|$$

$$Sy_1(x, y) = \sum_{m=1}^{M} \sum_{n=1}^{N-1} |S_{m,n} - S_{m+x,n+y+1}|$$

where x = ±1, −1 ≤ y ≤ 1.

$$S_{-1} = Sy_{-1}(h, y_{minh})$$ Expression 16

$$S_0 = Sy_0(h, y_{minh})$$

$$S_1 = Sy_1(h, y_{minh})$$

When $S_{-1} \leq S_1$, $y_h = y_{minh} + \frac{1}{2} \times \frac{S_{-1} - S_1}{S_1 - S_0}$ Expression 17

When $S_{-1} > S_1$, $y_h = y_{minh} + \frac{1}{2} \times \frac{S_{-1} - S_1}{S_{-1} - S_0}$ The lateral contrast HC and the longitudinal contrast VC of the standard data and the factor A to determine the superiority and inferiority in the two-dimensional interpolation calculation precision of the image shift amount calculation are thus calculated for each block, and a block where the contrasts HC and VC are high and the factor A is small is selected and extracted as the standard data. By such a selection of the detection block, a highly precise image shift detection can be performed with a small amount of calculation.

(4) Extraction of Reference Data

As shown in the section (1) of the image shift amount calculation, when the image shift amount calculation is performed with a standard data constituted by image data corresponding to M×N pixels and a reference data constituted by (M+2S+2)×(N+2S+2) image data, an image shift amount (x, y) is obtained in a range of approximately $-S-e \leq x \leq S+1$, $-S-e \leq y \leq S+1$. That is, the larger the number of reference data is, the larger image shift amount can be handled. However, the larger the number of reference data is, the larger the calculation amount is, so that the time lag of the image shift compensation increases. As a result, the image shift compensation cannot be made with a high precision. Therefore, it is necessary to extract a reference data with which the amount of image shift calculation is minimized and a large amount of image shift can be handled.

The extraction of the reference data will be described. For example, assume that a block $_{k,1}$ constituted by 8×8 adjoining pixels is selected as the detection block and that 4×4 processing data $G_{i,j}$ (8×(k−1)+13≤i≤8×(k−1)+16, 8×(e−1)+13≤j≤8×(e−1)+16) are stored in the standard data memory 15. The image shift amount of the reference data obtained by the nth accumulation by the image shift detection sensor 5 based on the standard data is assumed to be $(x_n, y_n)$, and the image shift amount of the reference data obtained by the next n+1th accumulation is assumed to be $(x_{n+1}, y_{n+1})$. When the shift amount of the subject image on the light receiving surface of the image shift detecting sensor 5 between the nth and n+1th accumulations is $(x_s, y_s)$; $x_{n+1}=x_n+x_s$ and $y_{n+1}=y_n+y_s$.

Assuming that the range of $(x_s, y_s)$ is $-s \leq x_s \leq s$, $-s \leq y_s \leq s$, the range of $(x_{n+1}, y_{n+1})$ can be expressed by $x_n-s \leq x_{n+1} \leq x_n+s$, $y_n-s \leq y_{n+1} \leq y_n+s$. This is modified into INT($x_n-s$)≤$x_{n+1}$<INT($x_n+s$)+1
INT($y_n-s$)≤$y_{n+1}$<INT($y_n+s$)+1

Figure 12:
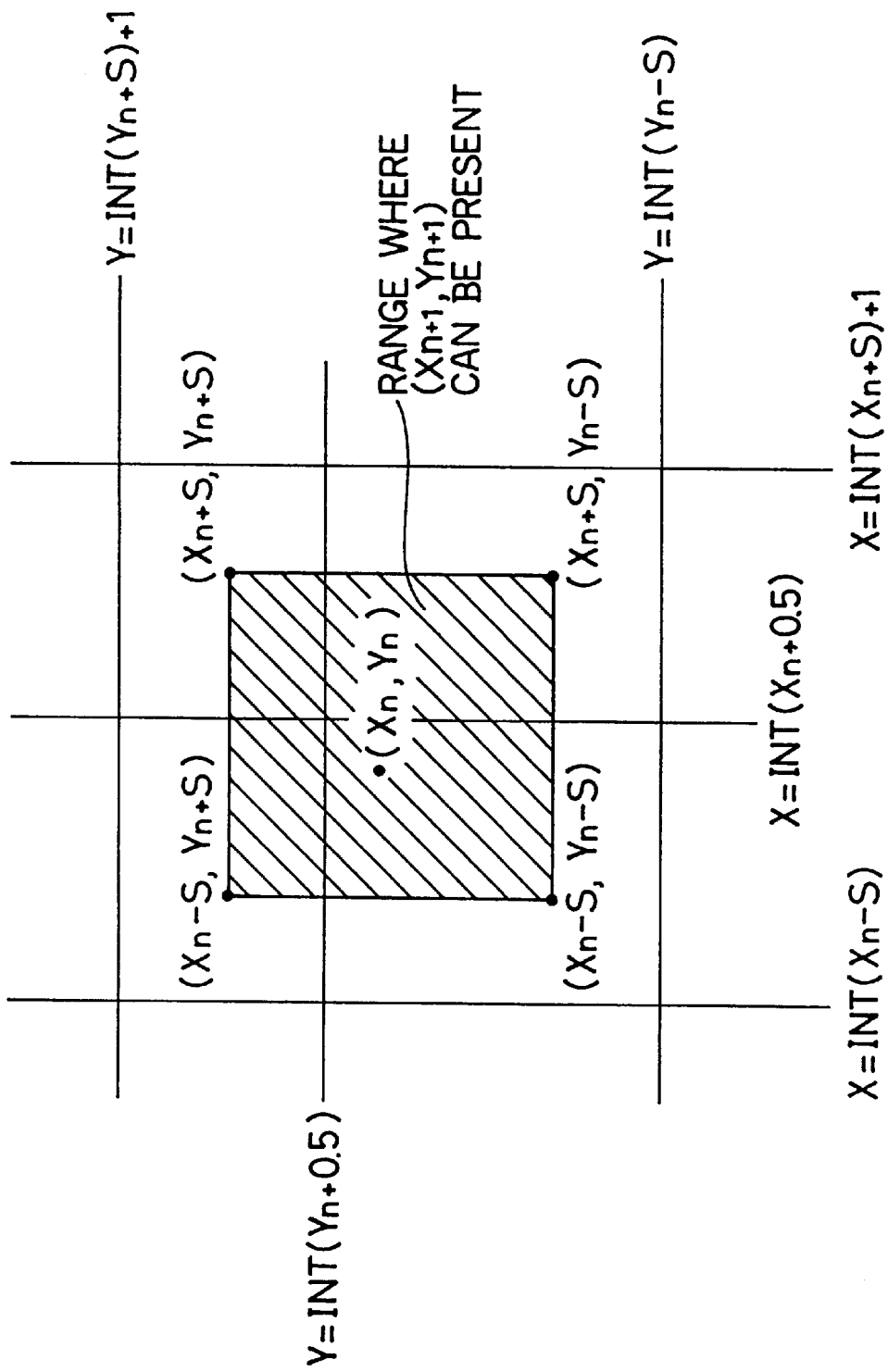
FIG. 12 is a schematic view of assistance in explaining a calculation performed in extracting the reference data.

(see FIG. 12). INT(x) is a function to omit the figures below the decimal point of x to make it integral.

To calculate an image shift amount in this range, a reference data constituted by processing data $G_{i,j}$ (8×(k−1)+INT($x_n-s$)+13≤i≤8×(k−1)+INT($x_n+s$)+17, 8×(e−1)+INT($y_n-s$)+13≤j≤8×(e−1)+INT($y_n+s$)+17) is extracted.

Since INT(a+b)−INT(a−b)=INT(2×b) or INT(2×b)+1, the necessary number of reference data is (INT(2×s)+6)×(INT(2×s)+6) at maximum. Then, the standard data is replaced by $S_{m,n}$ (1≤m≤4, 1≤n≤4) assuming that it can be expressed by an expression 18 shown below, and the reference data is replaced by $R_{m,n}$, (−INT($x_n+0.5$)+INT($x_n-s$)+1≤m≤INT($x_n+s$)−INT($x_n+0.5$)+5, −INT($y_n+0.5$)+INT($y_n-s$)+1≤n≤INT($y_n+s$)−INT($y_n+0.5$)+5) assuming that it can be expressed by an expression 19.

$$S_{m,n}=G_{8\times(k-1)+m+12,\ 8\times(e-1)+n+12} \quad \text{Expression 18}$$

$$R_{m,n}=G_{8\times(k-1)+m+INT(xn+0.5)+12,\ 8\times(e-1)+n+INT(yn+0.5)+12} \quad \text{Expression 19}$$

By using these data, the image shift calculation shown in the above section (1) is performed to calculate the image shift amount $(x_0, y_0)$, and (INT($x_n+0.5$)+$x_0$, INT($y_n+0.5$)+$y_0$) is obtained as the image shift amount of a reference data obtained by the (n+1)th accumulation. The extraction of the reference data thus performed minimizes the amount of image shift calculation and enables the apparatus to handle a large image shift amount.

(5) Estimation Calculation (of Image Shift Amount)

Figure 13:
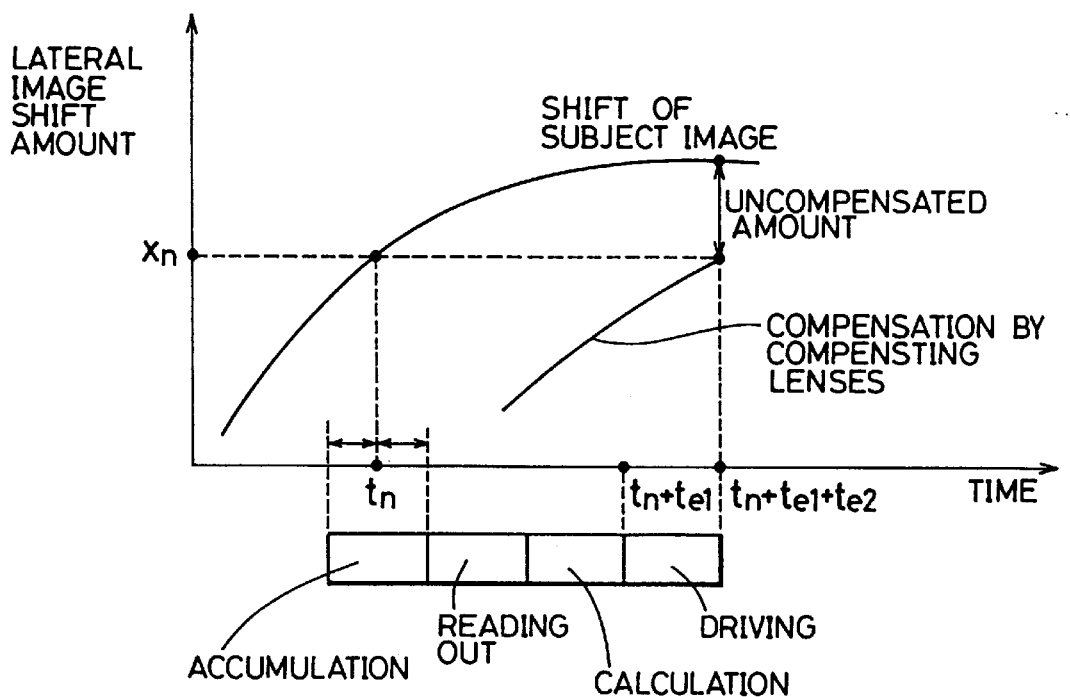
FIG. 13 is a diagram showing an example of a flow of image shift detection and compensation.

Referring first to FIG. 13, there is shown a brief flow of the image shift detection and compensation (only in the lateral direction). $x_n$ is an image shift amount of a reference data obtained by the nth accumulation by the image shift detecting sensor. Since the reference data is considered to be subject information obtained at an accumulation central time $t_n$ of the nth accumulation, the image shift amount $x_n$ is an image shift amount at the time $t_n$. At this time, the image shift amount $x_n$ is calculated at a time $t_n+t_{e1}$ due to the time lag of the reading out of the image data and the time lag of the image shift amount calculation, and transferred to the coefficient converter 19.

Further, by the time lag of driving of the compensating lenses, the compensation of the image shift amount $x_n$ is completed at a time $t_n+t_{e1}+t_{e2}$. For this reason, the difference between the image shift amount at the time $t_n+t_{e1}+t_{e2}$ and the image shift amount $x_n$ is left as an uncompensated image shift, so that it is impossible to highly precisely compensate for the image shift. To avoid this, an estimation calculation to eliminate the time lag of the image shift detection and compensation is necessary.

Figure 14:
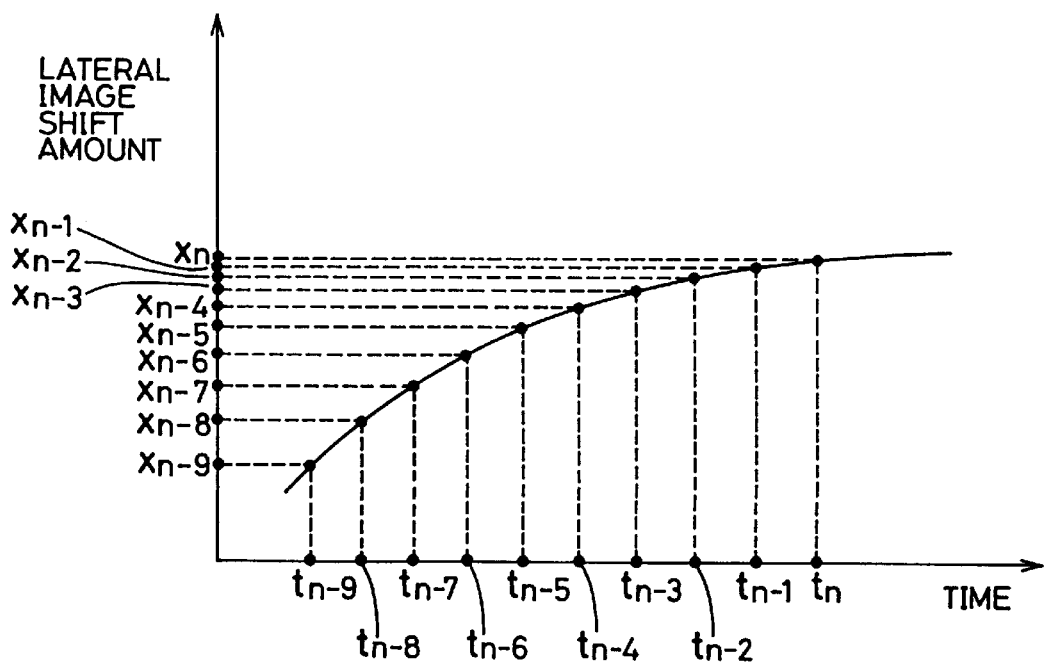
FIG. 14 is a diagram showing an example of a relationship between an image shift amount and time.

The details of the image shift amount estimation calculation will be described with reference to FIG. 14. In the figure, $x_n, x_{n-1}, x_{n-2}, \ldots, x_{n-9}$ are image shift amounts of the reference data obtained by the nth, (n−1)th, (n−2)th, …, (n−9)th accumulations by the image shift detecting sensor 5, respectively, and are image shift amounts at the accumulation central times $t_n, t_{n-1}, t_{n-2}, \ldots, t_{n-9}$, respectively. By using these data, the image shift amount at the time $t_n+t_{e1}+t_{e2}$ is estimated.

$$v_1 = \frac{x_n - x_{n-2}}{t_n - t_{n-2}} \quad \text{Expression 20}$$

First, a present image shift speed $v_1$ is calculated by the expression 20. The image shift speed is not calculated between the times $t_n$ and $t_{n-1}$ in order to increase the denominator (time) to improve the image shift speed detection precision. By using this, an estimated image shift amount px is calculated as $$px=x_n+v_1\times(t_{e1}+t_{e2})$$

This operation expression is premised that the image shift speed is constant. When the variation in image shift speed is great and when the time lag $(t_{e1}+t_{e2})$ is great, in view of the variation in speed (acceleration), a present image shift acceleration a is calculated by an expression 22 shown below by using a past image shift speed $v_2$ obtained by an expression 21 shown below.

$$v_2 = \frac{x_{n-1} - x_{n-3}}{t_{n-1} - t_{n-3}} \quad \text{Expression 21}$$

$$a = \frac{2\times(v_1 - v_2)}{t_n - t_{n-1} + t_{n-2} - t_{n-3}} \quad \text{Expression 22}$$

By using these, the estimated image shift amount px is calculated as $$px = x_n + v_1 \times (t_{e1} + t_{e2}) + a \times \frac{(t_{e1} + t_{e2})^2}{2}$$

By using this operation expression, a highly precise image shift amount estimation calculation is enabled even when the variation in image shift speed is great and when the time lag ($t_{e1}+t_{e2}$) is great.

When the accumulation time of the image shift detecting sensor 5 is short because of a high-luminance subject to decrease the intervals among the accumulation central times $t_n, t_{n-1}, t_{n-2}, \ldots,$ and $t_{n-9}$ and when more precise detection of the image shift speed and image shift acceleration is desired, the present image shift speed $v_1$ is calculated by an expression 23 shown below, the past image shift speed $v_2$ is calculated by an expression 24 shown below, and the present image shift acceleration a is calculated by an expression 25 shown below.

$$v_1 = \frac{x_n - x_{n-4}}{t_n - t_{n-4}} \qquad \text{Expression 23}$$

$$v_2 = \frac{x_{n-5} - x_{n-9}}{t_{n-5} - t_{n-9}} \qquad \text{Expression 24}$$

$$a = \frac{2 \times (v_1 - v_2)}{t_n + t_{n-4} - t_{n-5} - t_{n-9}} \qquad \text{Expression 25}$$

Thus, even if the luminance of a subject varies to vary the intervals (image shift detection intervals) among the accumulation central times and even if the focal length of the taking lens varies due to zooming to vary a required level of the image shift detection precision, these cases can be handled by employing an image shift amount estimation operation expression which is determined to be optimum.

By the image shift amount estimation calculation shown above, the time lag of the image shift detection and compensation is eliminated to enable a highly precise image shift compensation.

Subsequently, the general arrangement of the camera shake compensating system of this embodiment provided with the above-described function of the image shift detecting system will be described. Returning to FIG. 3, the detecting system forms light from a subject into an image on the image shift detecting sensor 5 through the detecting system lens 20. The image shift detecting sensor 5 converts the formed subject information into an electric signal and supplies the electric signal representative of the subject information to the image shift amount detector 13 through the A/D converter 11.

At the image shift amount detector 13, subject information obtained just before the image shift compensation driving, is stored as the standard data. By using as the reference data the subject information inputted through the A/D converter 11 during the image shift compensation driving, a predetermined comparison calculation of the standard and reference data is performed to generate an image shift amount data to drive the compensating lenses G1 and G2. The image shift amount data includes a longitudinal image shift amount showing an image shift amount when the camera body 1 )shakes upward and downward (in a direction perpendicular to the plane of the figure) and a lateral image shift amount showing an image shift amount when the camera body 1 shakes to the left and right.

The coefficient converter 19 has the following working: The longitudinal image shift data and the lateral image shift data from the image shift amount detector 13 are inputted to the coefficient converter 19 together with an output data of a temperature sensor T. The coefficient converter 19 converts the data into data associated with target movement positions of the compensating lenses G1 and G2 necessary for the compensating lenses G1 and G2 to actually compensating for the longitudinal and lateral image shift amounts appropriately.

The coefficient converter 19 also absorbs the following error factors associated with camera shake compensation to increase the precision of the camera shake compensation: (i) an error caused by the fact that proportional coefficients of the target lens positions relative to the image shift amount differ among each camera; (ii) an error caused by the fact that the proportional coefficient varies due to a change of camera with time; (iii) an error caused by the fact that the proportional coefficient varies with a variation in characteristics of each lens and a variation in electric characteristics due to a variation in temperature; and (iv) an error caused by a difference between the image shift directions of the longitudinal and lateral image shift amounts and the movement directions of the compensating lenses G1 and G2. The error (iv) is caused by a difference in direction generated in assembling the camera or by the arrangement of a subsequently-described driving mechanism of the compensating lenses G1 and G2.

The data associated with the coefficient converter 19 are stored in an electrically erasable programmable read only memory (EEPROM) because of the non-uniformity and the change with time of the camera.

The driving system is provided with the driving circuits 3a and 3b which drive the compensating lenses G1 and G2. Based on data of a target image shift compensation position data portion 21a of the compensating lens G1 and a target image shift compensation position data 21b of the compensating lens G2 from the coefficient converter 19, the G1 and G2 driving circuits 3a and 3b move the compensating lenses G1 and G2 to the target positions.

The G1 driving circuit 3a reads out the position of the compensating lens G1 based on a signal of the position detecting sensor P and drives an actuator Aa through feedback to move the compensating lens G1 to the target image shift compensation position. The G2 driving circuit 3b moves the compensating lens G2 in a like manner. The outputs of the position detecting sensors Pa and Pb are also inputted to the microcomputer 4 through the A/D converter 22 to generate data to confirm the present positions of the compensating lenses G1 and G2 at a G1 and G2 present position data portion 23.

Describing the optical system, by moving the compensating lens G1 substantially in a direction perpendicular to the plane of the figure and moving the compensating lens G2 substantially in a direction horizontal to the plane of the figure, the optical path of the light from the subject can be bent in a direction perpendicular to the optical axis according to the movement amounts of the lenses G1 and G2. During exposure, the lenses G1 and G2 are driven by the above-described driving system and the shift of the subject image due to camera shake is compensated for so that the subject image always remains stationary on the film surface, thereby obtaining a picture without any image blur even if the exposure time is long. Reference numeral 24 represents a glass cover.

Figure 15:
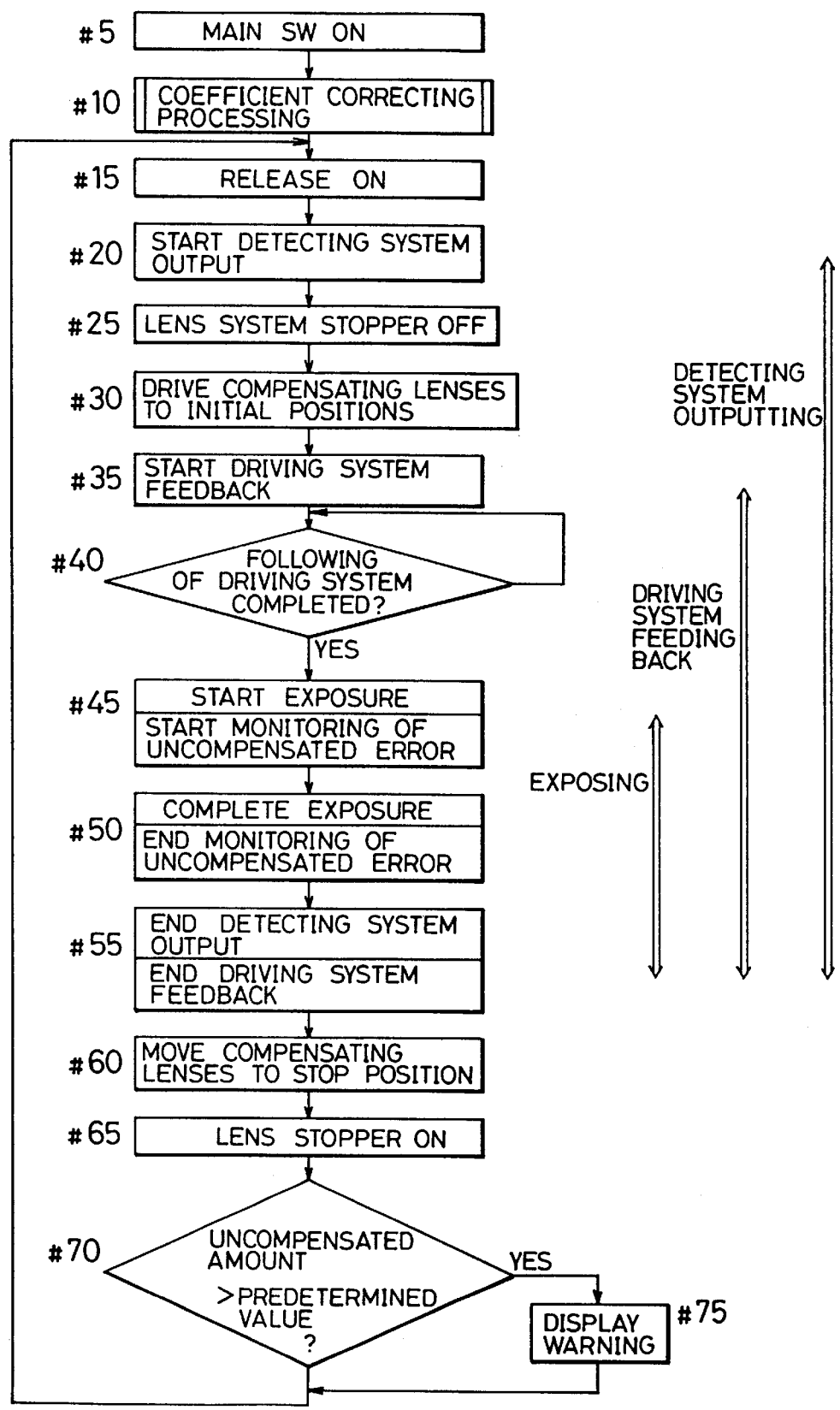
FIG. 15 is a flowchart showing the general sequence of the camera shake compensating system.

Subsequently, the general operation sequence of the camera shake compensating system will be described with reference to FIG. 15. When the main switch is turned on at step #5, the coefficient converter 19 performs a coefficient correcting processing at step #10. This processing is performed to correct the conversion coefficient used to convert the image shift amount from the detecting system into the target movement positions of the compensating lenses to remove the conversion errors caused by the change of the camera with time.

When a release button is depressed at step #15, the calculation of the image shift amount data by the detecting system is started at step #20. First, the subject information is read out from the image shift detecting sensor 5 and stored as the standard data. Then, based on a signal from the image shift detecting sensor controller 10, the reading of the subject information is continued until subsequently-performed exposure is completed and the image shift amount data is calculated as the reference data.

While the image shift amount data is being calculated, a lens system stopper is deactivated at step #25, and a signal is generated to drive the compensating lenses to initial positions located substantially in the center of the lens movable ranges at step #30. Then, in order to drive the compensating lenses G1 and G2 according to the image shift amount data from the detecting system, the target lens movement data obtained through the coefficient converter based on the image shift amount data from the detecting system are transmitted to the G1 and G2 driving circuits 3a and 3b.

At the microcomputer 4, since the data on the present positions of the compensating lenses G1 and G2 are obtained, the absolute value of the difference between the present position and the target position (i.e. the present uncompensated amount) is determined. When the compensating lenses are started to be driven from a stationary condition at step #35, at first, the present position does not follow the target position (i.e. the present uncompensated amount is great) for some period of time. If exposure is started during this period, the camera shake compensating function does not work correctly. To avoid this, a driving system following completion routine is executed at step #40 so that the process wait until the present uncompensated amount is stabilized at a small value.

When the present uncompensated amount is stabilized at a small value, exposure is started at step #45, and exposure is performed for a predetermined period of time by a non-illustrated photometry circuit. During exposure, the compensating lenses are moved by the driving system based on the image shift amount data from the detecting system to compensate for the camera shake and the absolute value of the difference between the present and target positions of the compensating lenses is monitored. The maximum value or the average value of the absolute value during exposure is stored as the uncompensated amount. After exposure is completed at step #50, the processings by the detecting system and the driving system are completed at step #60. Then, at step #65, to stop the compensating lenses G1 and G2, the lens system stopper is activated.

At step #70, the uncompensated amount during exposure can be great when compensation is insufficient due to a drastic change of camera shake during exposure. In this case, there are some blurs left in the exposed picture. The user is notified of this through a warning display.

Figure 16:
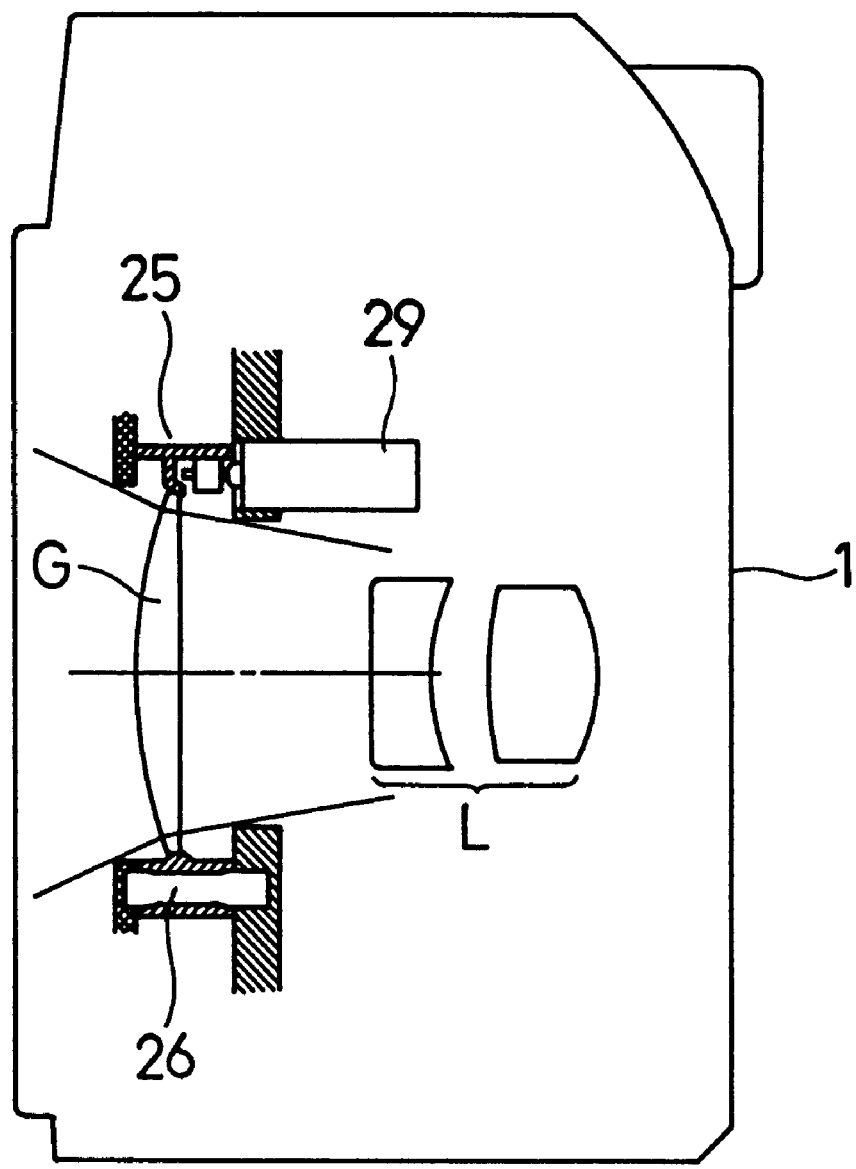
FIG. 16 is a longitudinal cross-sectional view schematically showing the arrangement of a driving unit which is the basic unit of a driver.
Figure 17:
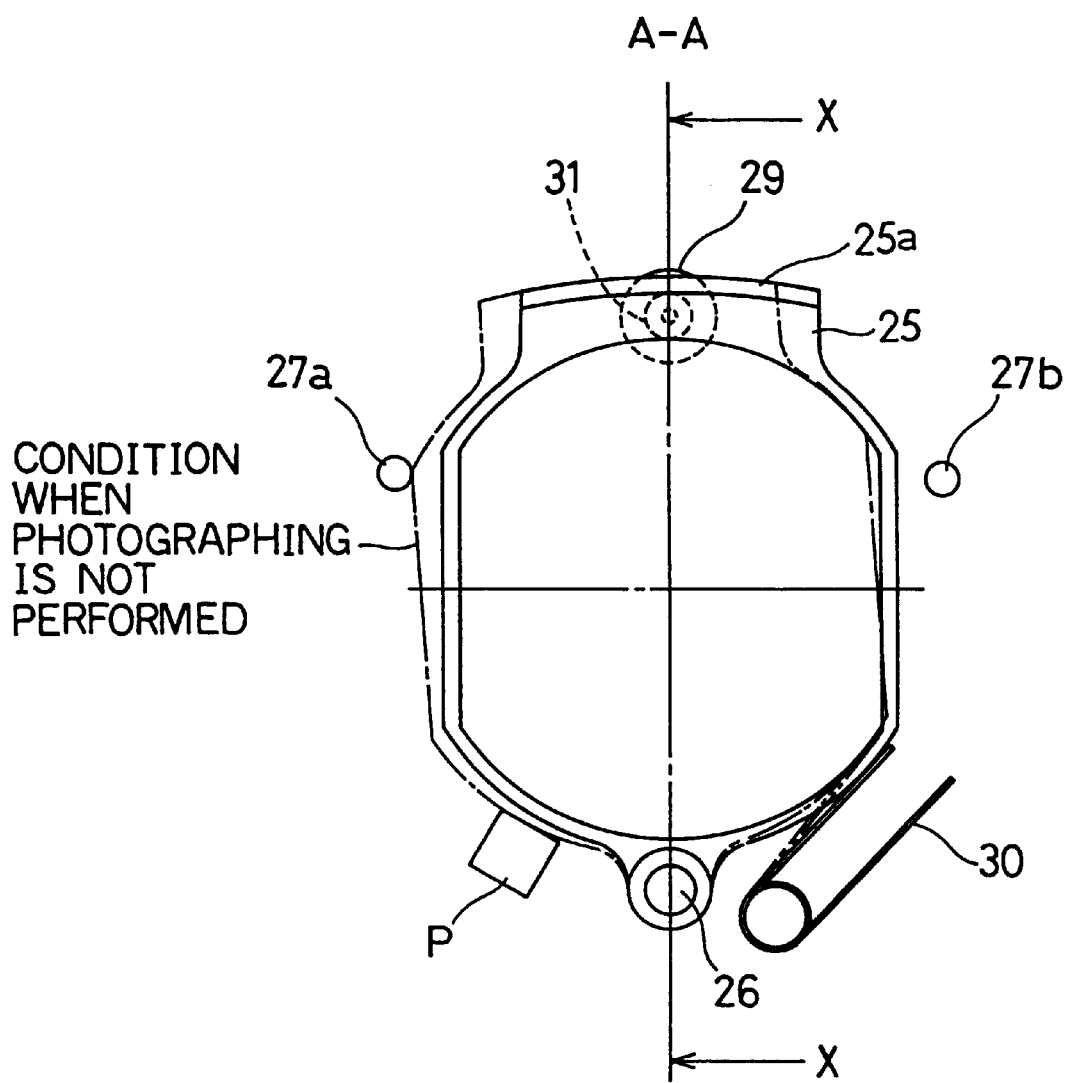
FIG. 17 is a front view showing a compensating lens holding mechanism.
Figure 18:
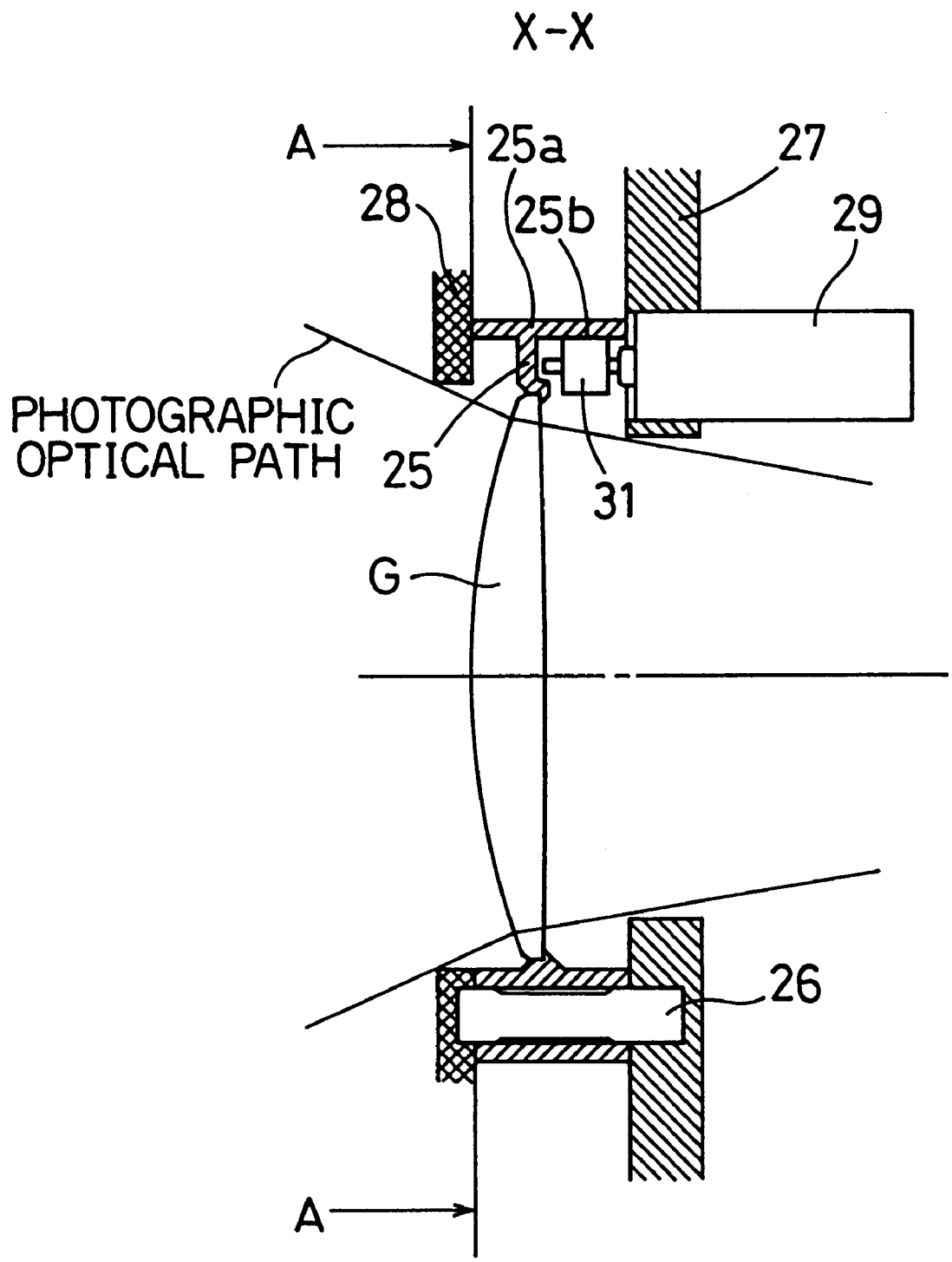
FIG. 18 is a longitudinal cross-sectional view of the mechanism.

Subsequently, the mechanical structure and operation of the compensating lens driver will be described with reference to FIGS. 16 to 24. For simplicity, FIGS. 16 to 18 shows a driving unit for one lens G as a basic structure of the compensating lens driver of this embodiment. A lens frame 25 which holds the compensating lens G is pivotally supported by a rotational shaft 26 and formed to be rotatable about the compensating lens G along its periphery. The rotating axis 26 is fixed to a cylindrical holder 27. Reference numeral 28 represents a curbing member which curbs unnecessary movements of the lens frame 25 along the optical axis by nipping a driven portion 25a of the lens frame 25.

Reference numeral 29 represents an actuator supported by the cylindrical holder 27. The actuator 29 is arranged outside the photographic optical path and drives the lens frame 25 around the rotational shaft 26. A part of the actuator 29 is located closer to the optical axis than a periphery of the compensating lens G. The cylindrical holder 27 has portions 27a and 27b which restrict the rotation range of the lens frame 25. L represents a master lens.

Figure 19:
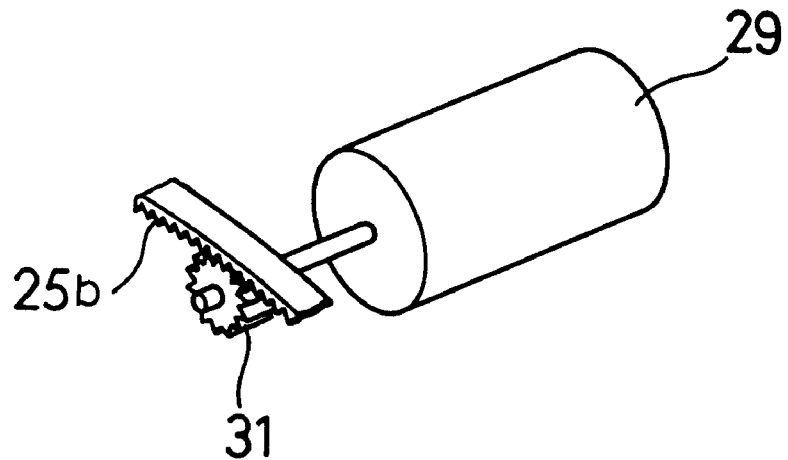
FIG. 19 is a perspective view showing a mode of an engagement between a lens frame and a pinion.
Figure 20:
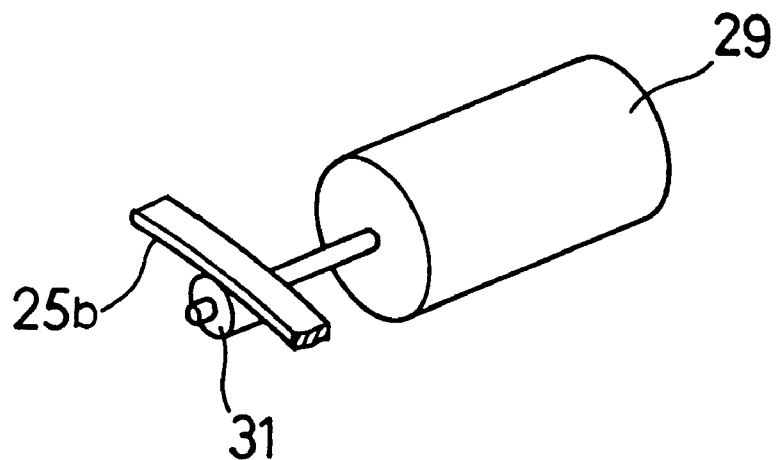
FIG. 20 is a perspective view showing another mode of the engagement between the lens frame and the pinion.

When photographing is not performed, the lens frame 25 is pressed against a rotation range restricting portion 27a by a pushing spring 30, and in photographing, it moved to a predetermined position by the actuator 29. The driving force of the actuator 29 is transmitted to the lens frame 25 by an engagement between a pinion 31 and the driven portion 25a of the lens frame 25. The engagement between an inner diameter portion 25b of the driven portion of the lens frame 25 and the pinion 31 may be made by a gear connection as shown in FIG. 19 or by a frictional force between the inner diameter portion 25b of the driven portion of the lens frame 25 and the pinion 31 as shown in FIG. 20.

Figure 21:
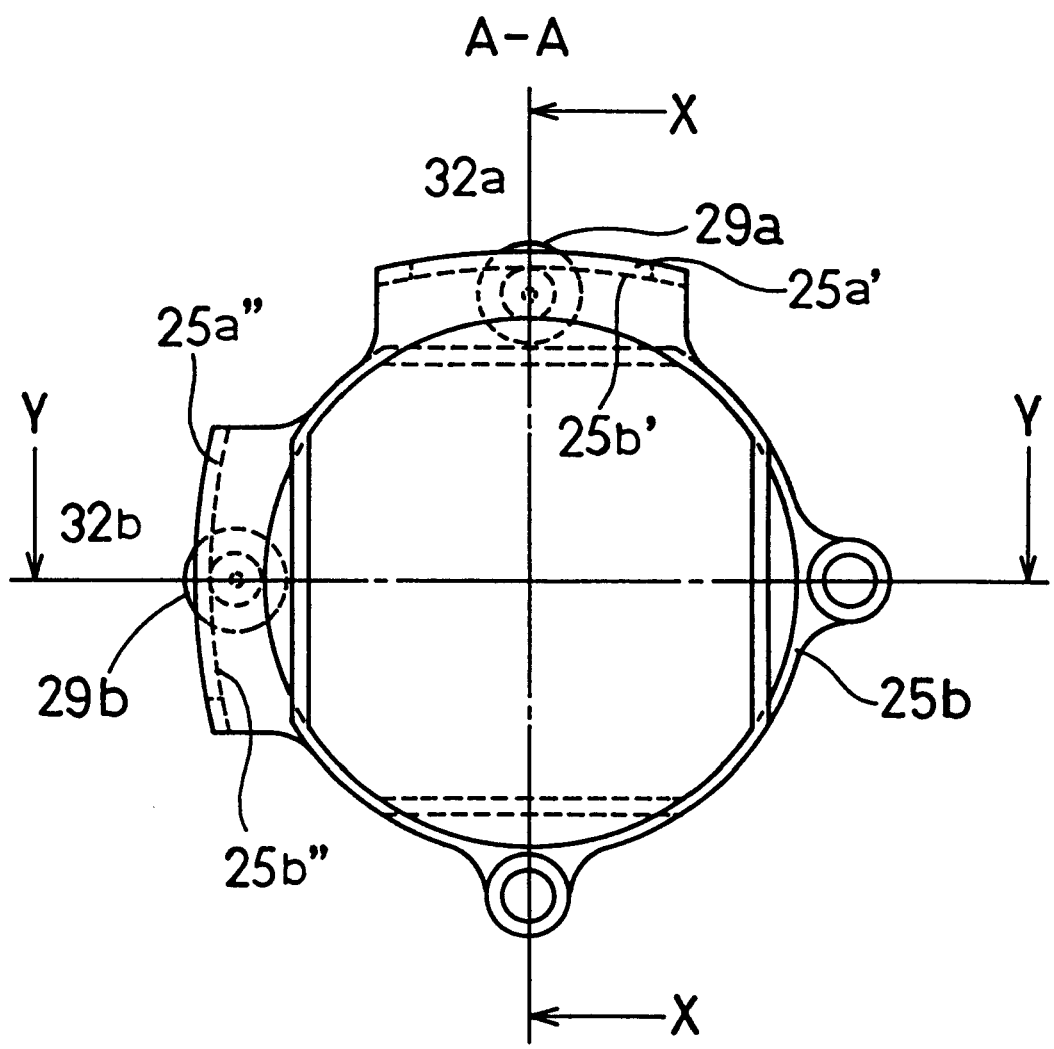
FIG. 21 is a front view showing a lens driver of the embodiment.
Figure 22:
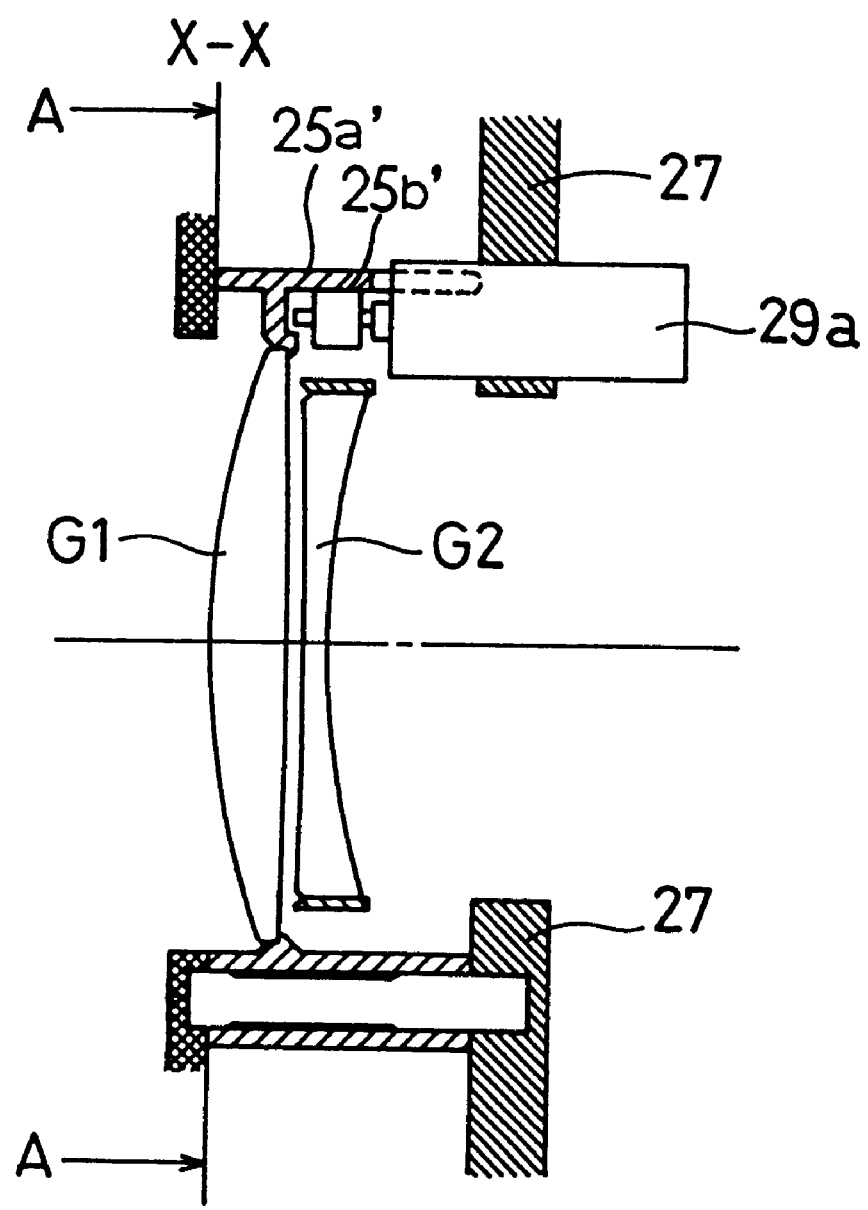
FIG. 22 is a cross-sectional view taken on line X—X of FIG. 21.
Figure 23:
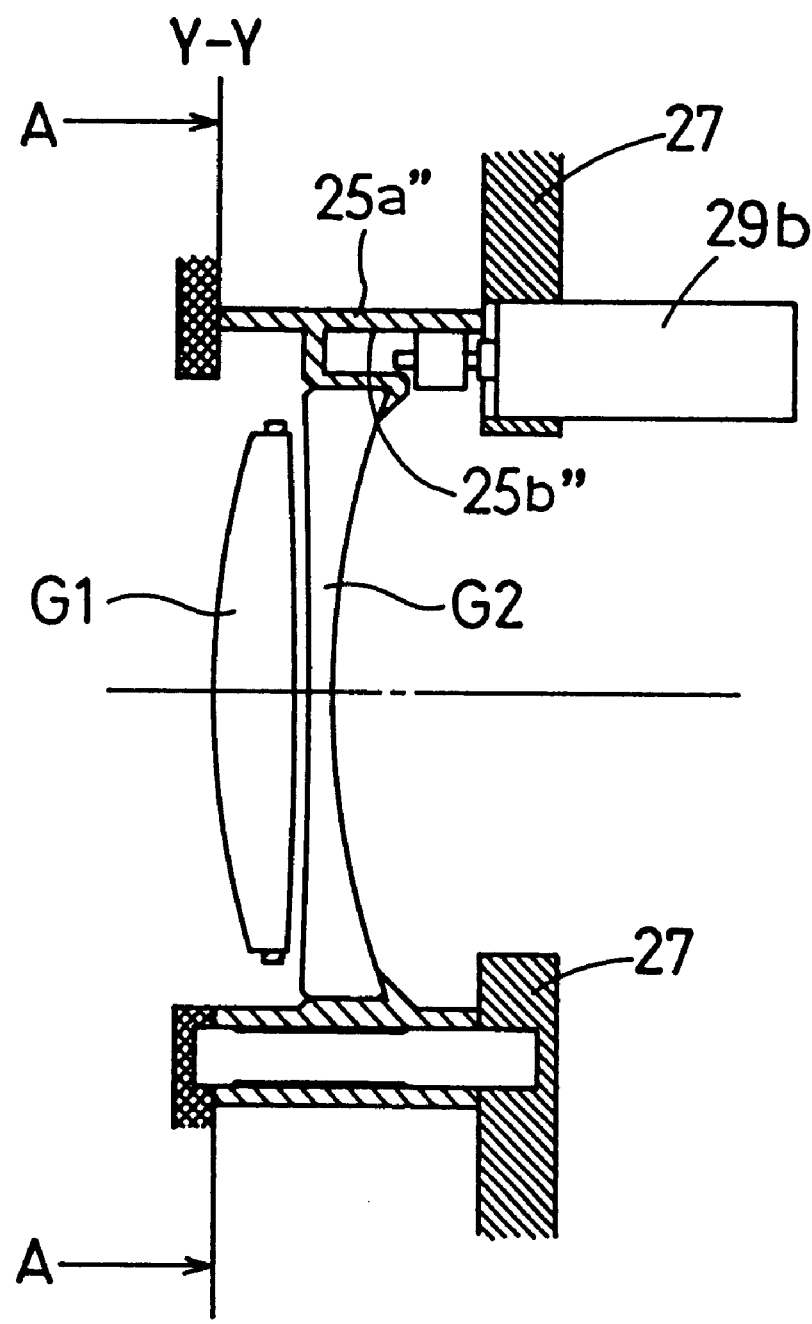
FIG. 23 is a cross-sectional view taken on line Y—Y of FIG. 21.

FIGS. 21 to 23 show the structure of the driver of this embodiment using two lens driving units of the above-described structure. As shown in these figures, the two driving units 32a and 32b are arranged so that their movement directions are substantially orthogonal to each other and that their lens centers are located one in front and the other in the rear so as to coincide with the optical axis when the lenses are placed in the center of the compensating lens movable range.

Moreover, the driver of this embodiment is assembled so that the movement direction of one of the compensating lenses G1 and G2 is vertical and the movement of the other is horizontal when the camera is laterally held. In the mechanism, the movement direction of a weighty lens unit, i.e. a lens unit having a great moment of inertia is set to be vertical in order to reduce power consumption.

Figure 24:
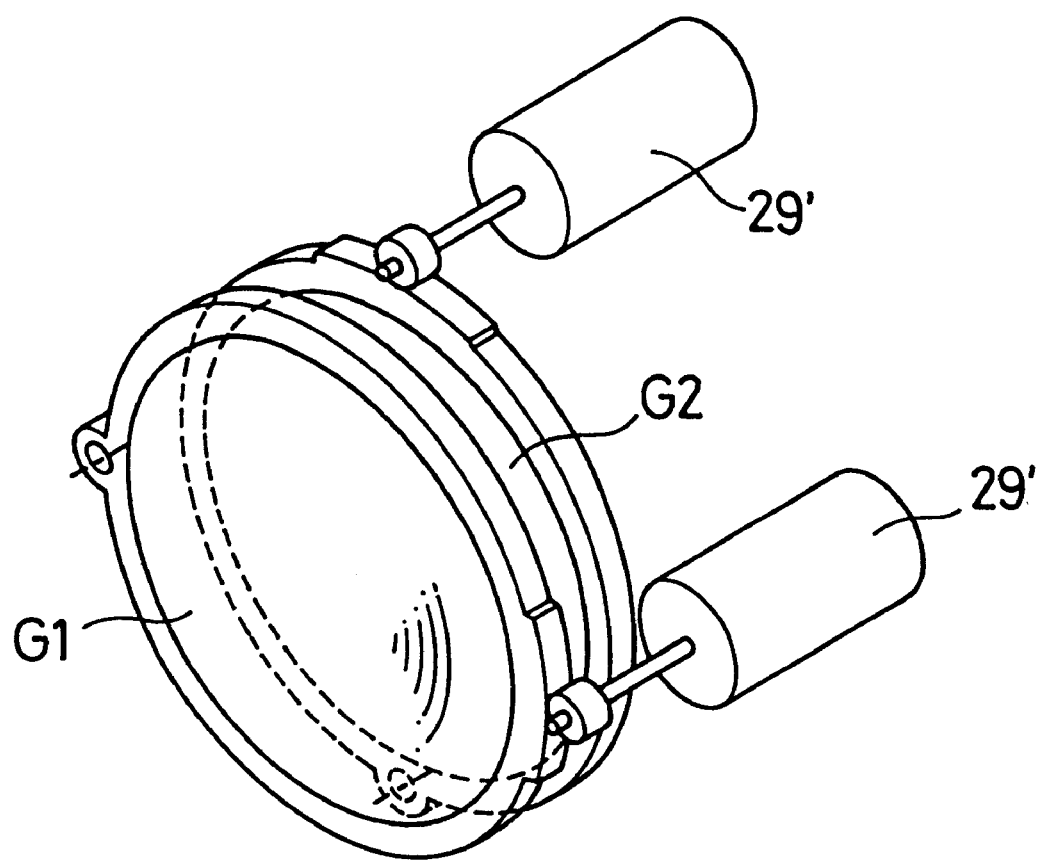
FIG. 24 is a perspective view showing a modification of the lens driver.

As a structure slightly different from the above-described structure, for example as shown in FIG. 24, a structure is practicable which employs an engagement between an actuator 29' and a driven portion of a lens frame driven thereby.

Figure 25A:
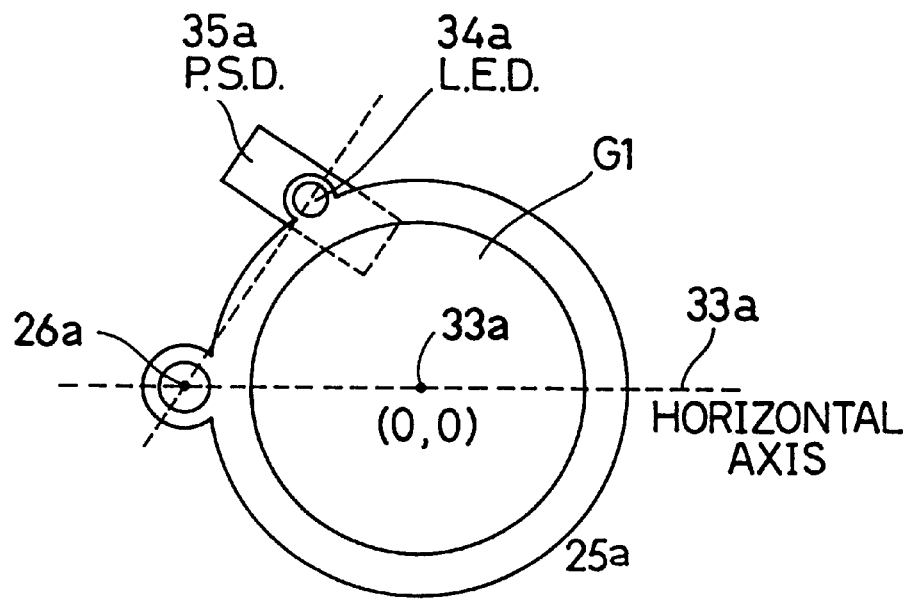
FIGS. 25A and 25B are front views showing conditions of the front and rear compensating lenses at their basic positions.
Figure 25B:
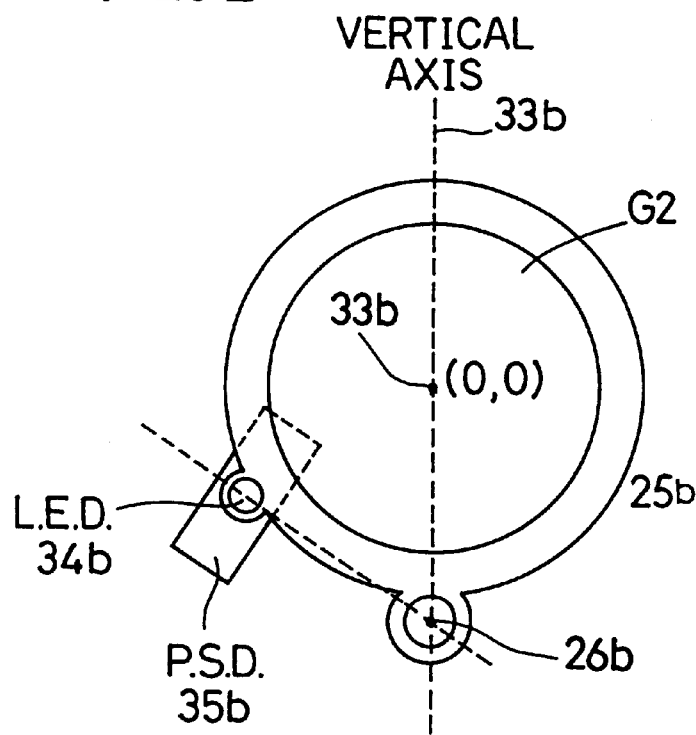

A calculation for controlling the positions of the compensating lenses will be described. FIG. 25A shows the front compensating lens G1 located at its basic position and FIG. 25B shows the rear compensating lens G2 located at its basic position. Under this condition, a straight line between a central axis 33a of the front compensating lens G1 and its rotational shaft 26a and a straight line connecting between a central axis 33b of the rear compensating lens G2 and its rotational shaft 26b coincide with the horizonal axis and the vertical axis of the camera, respectively. While the compensating lenses G1 and G2 are separately shown in FIGS. 25A and 25B, the central axes 33a and 33b of the compensating lenses G1 and G2 coincide with each other.

The positions of the central axis 33a of the front compensating lens G1 and the central axis 33b of the rear compensating lens G2 under this condition are defined as (0, 0) and (0, 0), respectively, by using coordinates on the horizontal and vertical axes of the camera. The rotational shafts 26a and 26b and the central axes 33a and 33b of the compensating lenses G1 and G2 are parallel to each other, and the compensating lenses G1 and G2 move within surfaces parallel to each other, i.e. vertical to the central axes 33a and 33b.

To the lens frames 25a and 25b of the lenses G1 and G2, light emitting diodes (LEDs) 34a and 34b are attached. PSD 35a and 35b for monitoring the present positions of the LEDs 34a and 34b are fixed to the cylindrical holder 27 so that their light receiving surfaces are parallel to the surface within which the compensating lenses G1 and G2 move.

When the compensating lenses G1 and G2 are located at their basic positions, straight lines between the rotational shafts 26a and 26b of the lenses G1 and G2 and the centers of the LEDs 34a and 34b, and detection directions of the PSDs 35a and 35b are vertical to each other. The irradiation light of the LEDs 34a and 34b are projected to the centers of the PSDs 35a and 35b. The light projection positions of the LEDs 34a and 34b to the PSDs 35a and 35b at this time are defined as 0 by using a coordinate parallel to the detection directions of the PSDs 35a and 35b.

The distances from the rotational shafts 26a and 26b of the compensating lenses G1 and G2 to the central axes 33a and 33b thereof are $r_1$ and $r_2$, respectively. The distances from the rotational shafts 26a and 26b of the compensating lenses G1 and G2 to the centers of the PSDs 35a and 35b are $e_1$ and $e_2$, respectively.

Figure 26A:
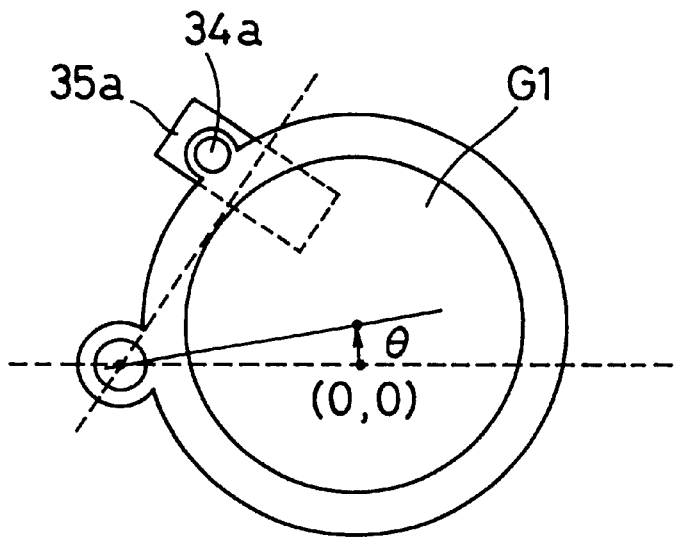
FIGS. 26A and 26B are front views showing conditions of the front and rear compensating lenses after they have rotated counterclockwise.
Figure 26B:
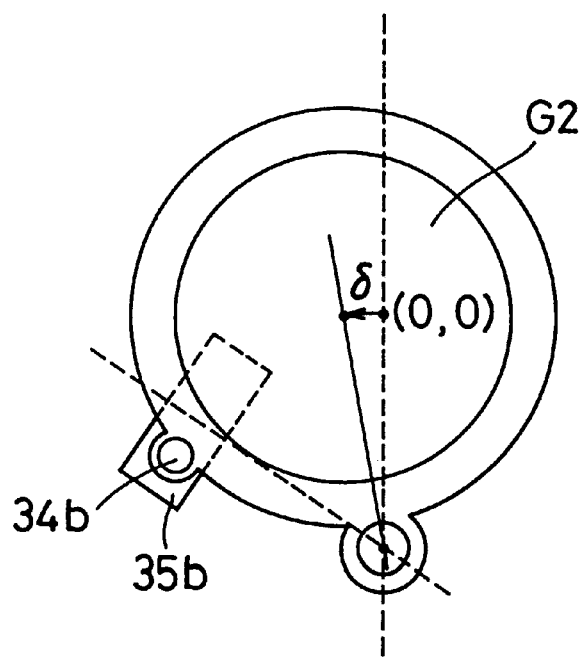

FIGS. 26A and 26B show a condition where the front compensating lens G1 has rotated counterclockwise by $\theta$ and a condition where the rear compensating lens G2 has rotated counterclockwise by $\delta$, respectively. A position $(x_1, y_1)$ of the central axis 33a of the front compensating lens G1 and a position $(x_2, y_2)$ of the central axis 33b of the rear compensating lens G2 under this condition are respectively $$x_1 = r_1 \times (\cos\theta - 1), \quad y_1 = r_1 \sin\theta$$

$$x_2 = -r_2 \times \sin\delta, \quad y_2 = r_2 \times (\cos\delta - 1)$$

where $-45° < \theta < 45°$, $-45° < \delta < 45°$.

A light projection position $p_1$ on the PSD 35a of the LED 34a of the compensating lens G1 and a light projection position $p_2$ on the PSD 35b of the LED 34b of the compensating lens G2 are respectively $$p_1 = e_1 \times \sin\theta = \frac{e_1}{r_1} \times y_1$$

$$p_2 = e_2 \times \sin\delta = -\frac{e_2}{r_2} \times x_2$$

where the positive directions of $\theta$ and $p_1$ are the same and the positive directions of $\delta$ and $p_2$ are the same.

The compensation of the subject image by the compensating lenses G1 and G2 is made by bending the optical axis by $\theta_x$ around the vertical axis and by $\theta_y$ around the horizontal axis. The compensation angles $\theta_x$ and $\theta_y$ are expressed by the following expression by using the position $(x_1, y_1)$ of the central axis 33a of the compensating lens G1 and the position $(x_2, y_2)$ of the central axis 33b of the compensating lens G2:

$$\theta_x = k_1 \times x_1 + k_2 \times x_2$$
$$= k_1 \times r_1 \times (\cos\theta - 1) - k_2 \times r_2 \times \sin\delta$$

-continued
$$\theta_y = k_1 \times y_1 + k_2 \times y_2$$
$$= k_1 \times r_1 \times \sin\theta + k_2 \times r_2 \times (\cos\delta - 1)$$

By modifying the above expressions, an expression 26 shown below is obtained. Thus, from the compensation angles $\theta_x$ and $\theta_y$, the position $(x_1, y_1)$ of the central axis 33a of the compensating lens G1 and the position $(x_2, y_2)$ of the central axis 33b of the compensating lens G2 are calculated $$k_1 \times x_1 = \frac{\theta_x - K_1}{2} + \frac{\theta_x + K_1}{2} \times B - (\theta_y + K_2) \times A \quad \text{Expression 26}$$

$$k_1 \times y_1 = \frac{\theta_y + K_2}{2} + \frac{\theta_y + K_2}{2} \times B + (\theta_x + K_1) \times A$$

$$k_2 \times x_2 = \frac{\theta_x + K_1}{2} - \frac{\theta_x + K_1}{2} \times B + (\theta_y + K_2) \times A$$

$$k_2 \times y_2 = \frac{\theta_y - K_2}{2} - \frac{\theta_y + K_2}{2} \times B - (\theta_y + K_1) \times A$$

where $K_1 = k_1 \times r_1$, $K_2 = k_2 \times r_2$ $$B = \frac{K_1^2 - K_2^2}{(\theta_x + K_1)^2 + (\theta_y + K_2)^2}$$

$$A = \frac{1}{2} \times \sqrt{-1 + \frac{2 \times (K_1^2 + K_2^2)}{(\theta_x + K_1)^2 + (\theta_y + K_2)^2} - B^2}$$

Now, an approximation for simplifying these expressions will be considered. The higher the order of the approximate expression is, the higher the calculation precision is, but the calculation amount increases. In this case, a fourth-order approximate expression shown by an expression 27 shown below is used to truncate the terms below the fourth order, and by an expression 28 shown below, the values of $x_1$, $y_1$, $x_2$ and $y_2$ are obtained. The projection positions $p_1$ and $p_2$ of the LEDs 34a and 34b on the PSDs 35a and 35b corresponding to the approximation values take values shown by an expression 29 shown below.

$$\frac{1}{1+a} \approx 1 - a + a^2 - a^3 \quad \text{Expression 27}$$

$$\sqrt{1+a} \approx 1 + \frac{a}{2} - \frac{a^2}{8} + \frac{a^3}{16}$$

$$x_1 \approx -\frac{\theta_y}{2 \times k_1 \times K_1} \times \left(\theta_y + \frac{\theta_x^2}{K_2}\right) \quad \text{Expression 28}$$

$$y_1 \approx \frac{\theta_y}{k_1} + \frac{\theta_x}{2 \times k_1 \times K_2} \times \left(\theta_x + \frac{\theta_y^2}{K_1}\right)$$

$$x_2 \approx \frac{\theta_x}{k_2} + \frac{\theta_y}{2 \times k_2 \times K_1} \times \left(\theta_y + \frac{\theta_x^2}{K_2}\right)$$

$$y_2 \approx -\frac{\theta_x}{2 \times k_2 \times K_2} \times \left(\theta_x + \frac{\theta_y^2}{K_1}\right)$$

$$p_1 \approx \frac{e_1 \times \theta_y}{K_1} + \frac{e_1 \times \theta_x}{2 \times K_1 \times K_2} \times \left(\theta_x + \frac{\theta_y^2}{K_1}\right) \quad \text{Expression 29}$$

$$p_2 \approx -\frac{e_2 \times \theta_x}{K_2} - \frac{e_2 \times \theta_y}{2 \times K_1 \times K_2} \times \left(\theta_y + \frac{\theta_x^2}{K_2}\right)$$

That is, by controlling the lens positions so that the light projection positions of the LEDs 34a and 34b of the compensating lenses G1 and G2 on the PSDs 35a and 35b are the positions $p_1$ and $p_2$, the optical axis can be bent substantially by $\theta_x$ around the vertical axis and by $\theta_y$ around the horizontal axis.

For example, when $r_1=r_2=20$ mm, $k_1=-k_2=k$, $\theta_x=\pm 2\times k$ and $\theta_y=\pm 2\times k$, the positions of the central axes of the lenses G1 and G2 are as shown in Table 1. On the contrary, when the light projection positions $p_1$ and $p_2$ of the LEDs on the PSDs are controlled by using the above approximate expression (expression 27), the positions are as shown in Table 2. Moreover, when $r_1=r_2=20$ mm, $k_1=-k_2/2=k$, $\theta_x=\pm 4\times k$ and $\theta_y=\pm 2\times k$, the positions of the central axes of the lenses G1 and G2 are as shown in Table 3. On the contrary, when the light projection positions $p_1$ and $p_2$ of the LEDs on the PSDs are controlled by using the above approximate expression (expression 27), the positions are as shown in Table 4.

That is, when $r_1=r_2=20$ mm, if approximately $x_2=\pm 2$ mm and $y_1+2$ mm, $x_2$ and $y_1$ are controlled with a precision of approximately 10 $\mu$m by a third-order approximate expression and the error is approximately ± several millimeters. When a higher precision is necessary, a higher-order approximate expression is used. When the precision is not very important, a first- or second-order approximate expression is used. Thus, by using an approximate expression of an order in accordance with the required control precision of the compensating lenses, the positions of the compensating lenses can be controlled with a comparatively small amount of calculation.

Figure 27:
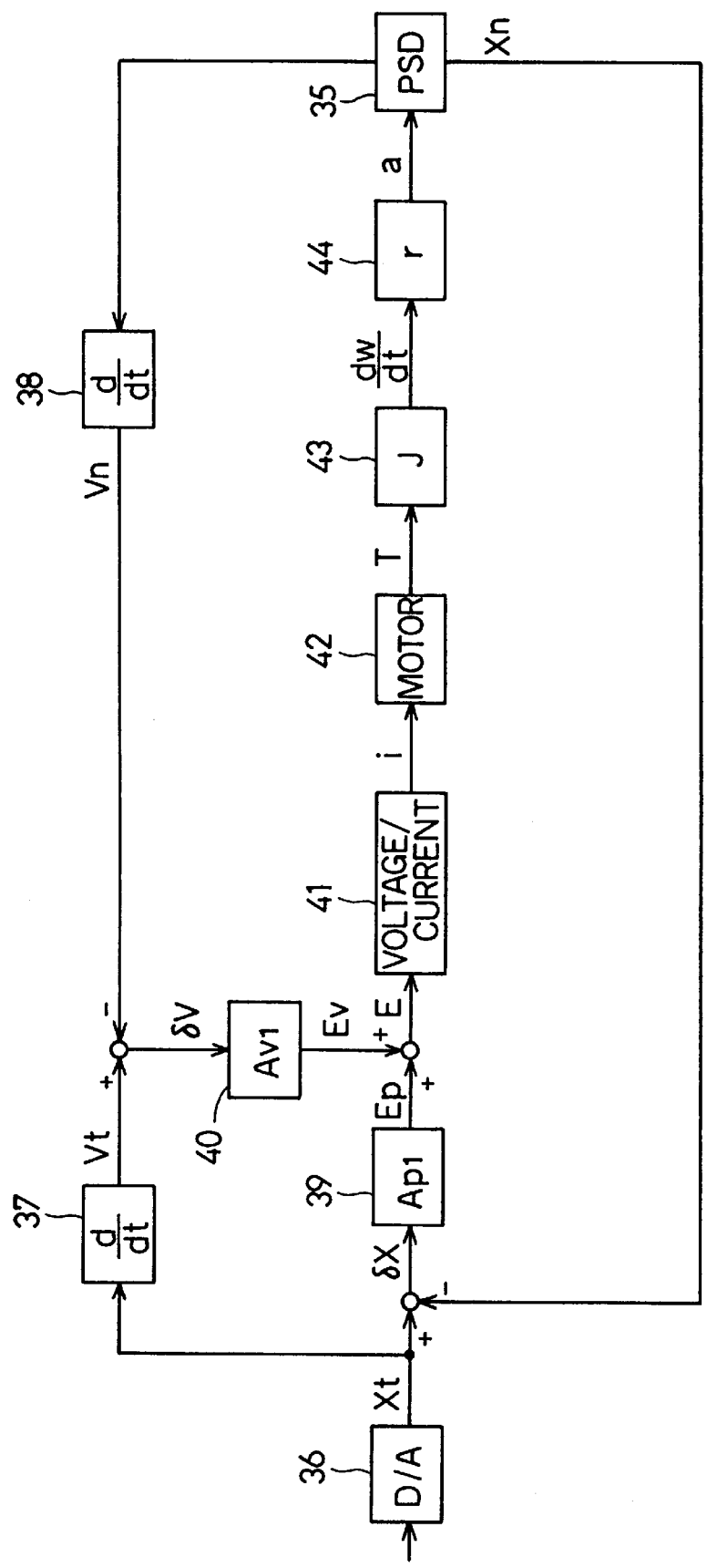
FIG. 27 is a circuit diagram showing a drive control block.

Subsequently, the control of the positions of the compensating lenses will be described. Referring to FIG. 27, there is shown the circuit arrangement of a control block serving as the compensating lens driving circuit (block diagram only in one direction is shown). The drive control block drives the compensating lenses G1 and G2 in correspondence with the image shift amount calculated in the microcomputer 4. The target position data of the compensating lenses G1 and G2 calculated in the microcomputer 4 and converted by the coefficient converter 19 are inputted to a drive control servo circuit through a D/A converter 36 ($x_t$). In actuality, the position information of the compensating lenses G1 and G2 is outputted within the circuit by a subsequently-described PSD.

In FIG. 27, the position information of $x_t$ and $x_n$ is differentiated by differentiators 37 and 38 to output a target speed $v_t$ and an actual drive speed $v_n$. Gains $A_{p1}$ and $A_{v1}$ optimum for a position deviation $\delta x=x_t-x_n$ and a speed deviation $\delta v=v_t-v_n$ are set by gain generators 39 and 40 to output a motor control voltage E=Ep+Ev. The optimum gains $A_{p1}$ and $A_{v1}$ are, for example, gains at which responsibility is excellent and oscillation barely occurs.

By voltage-to-current converting the outputs of the gain generators 39 and 40 by a motor driver 41 to conduct the motor, a motor 42 is driven, so that a driving force T is generated to an inertia J43. By the driving force T, the motor 42 is angularly accelerated at dw/dt, so that the lenses receive the acceleration a through a transmission system 44 to move. By taking out the motion information as a position signal by a PSD 35, a feedback control is performed so that the deviations of $x_t$ and $x_n$ are eliminated.

Figure 28:
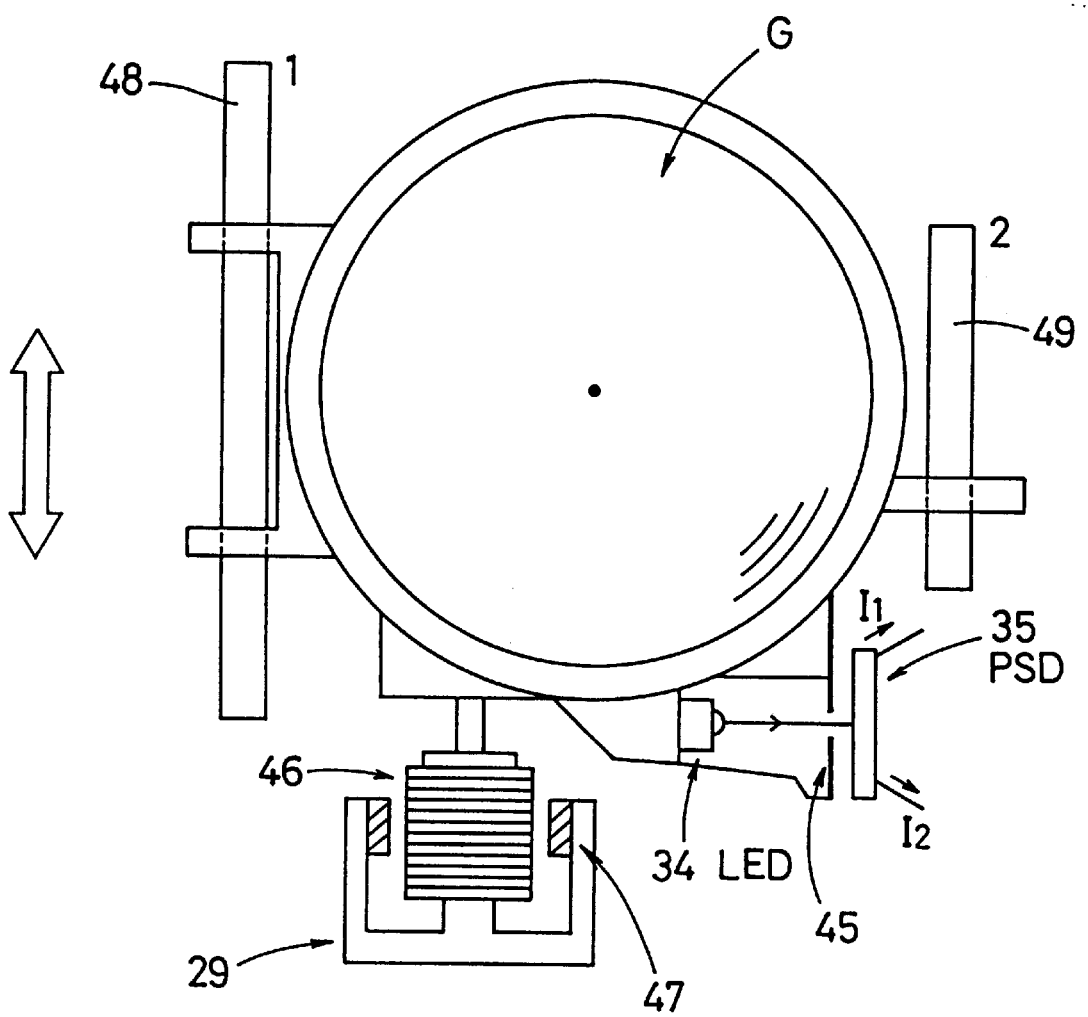
FIG. 28 is a front view showing the arrangement of a position detecting sensor.

Referring to FIG. 28, there is shown the structure of a position detecting sensor P. The position detecting sensor P includes an LED 34, a slit 45 and the PSD 35. For simplicity, the structure shown in FIG. 28 slightly differs the actual structure of this embodiment. First, the drive principle of the driving system will be described. The actuator 29 is of a moving coil type and generates a driving force of F=ηIBL (efficiency coefficient of η≈0.9) based on a current I to be flowed through a coil 46, a magnetic flux density B of a magnetic circuit 47 and an active coil length L of the coil.

By the driving force, the compensating lens G moves upward and downward along guiding shafts 48 and 49. The LED 34 and the slit 45 are integrally provided above the compensating lens G to move in correspondence with the movement of the compensating lens G. That is, light discharged from the slit 45 is the same as the movement of the compensating lens G. The movement of the light is detected by the fixed PSD.

Figure 29:
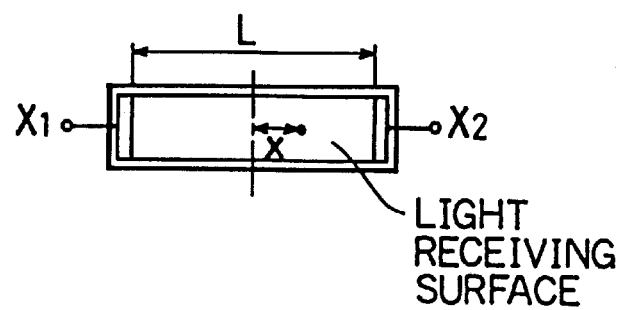
FIG. 29 is a schematic view of assistance in explaining a position detection principle of a position sensitive device (PSD) for one-dimensional detection.

Referring now to FIG. 29, the principle of position detection of a PSD for one-dimensional detection will be described. When the center of gravity of light is located at a position which is a distance x away from the center of the PSD to the right, the relationship among an output current obtained from each pole and x and L are as shown by an expression 30 shown below. The relationship of an expression 31 shown below can be obtained by using voltages $V_{x1}$ and $V_{x2}$ obtained by current-to-voltage converting the current.

$$\frac{X_2 - X_1}{X_1 + X_2} = \frac{2x}{L} \qquad \text{Expression 30}$$

where L is the area of the light receiving surface of the PSD, x is the position of the center of gravity of light irradiated thereto, and $X_1$ and $X_2$ are output signals (photocurrents) obtained from the poles.

$$\frac{V_{x2} - V_{x1}}{V_{x1} + V_{x2}} = \frac{2x}{L} \qquad \text{Expression 31}$$

$$V_{x1} = RX_1$$

$$V_{x2} = RX_2$$

where R is a current-to-voltage converting resistor.

$$\text{When } V_{x1} + V_{x2} \text{ is fixed, } V_{x2} - V_{x1} \propto x \qquad \text{Expression 32}$$

Figure 30:
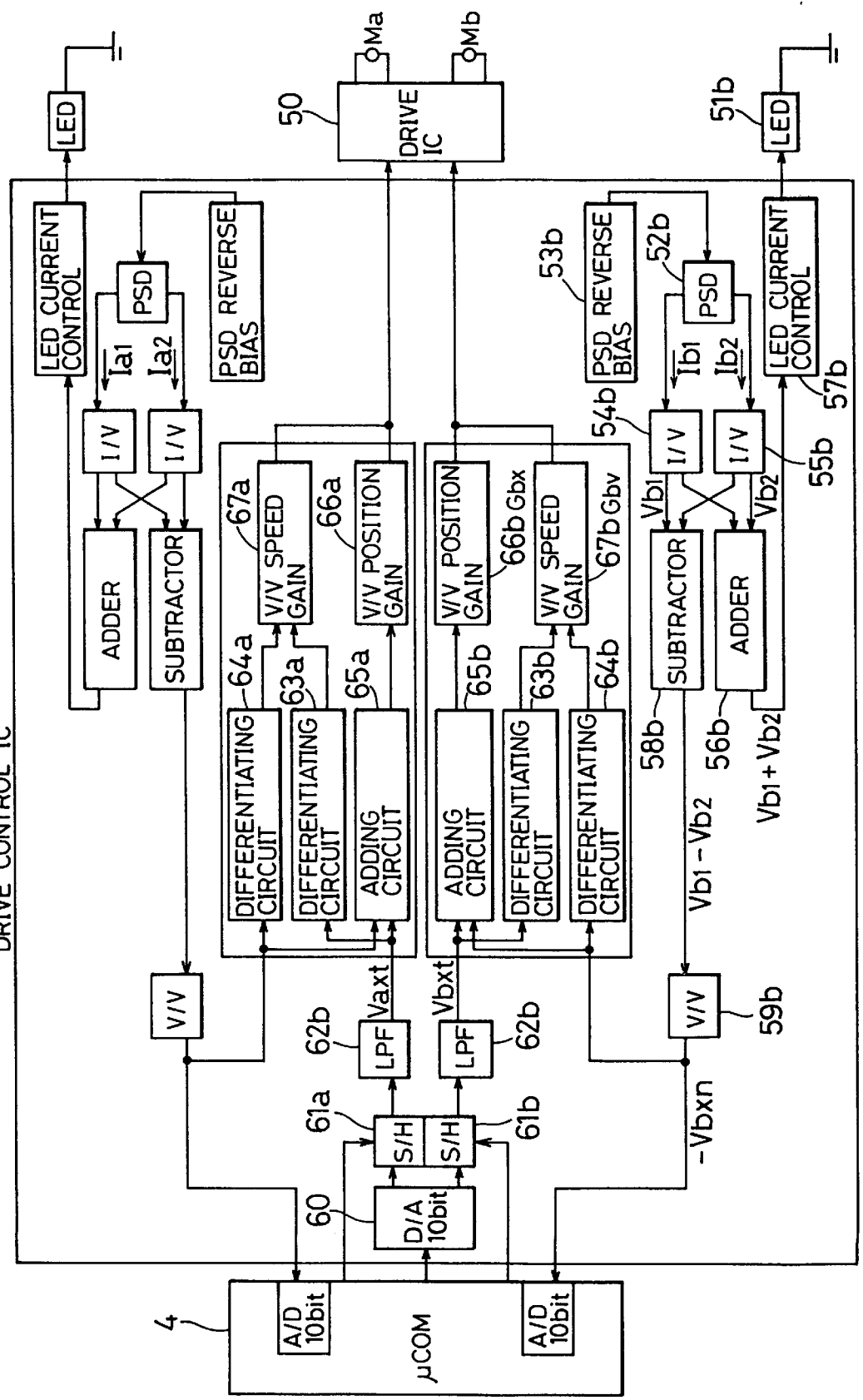
FIG. 30 is a block diagram showing a drive control intergrated circuit (IC)

Subsequently, a drive control integrated circuit (IC) shown in FIG. 30 will be described. The target specifications provided to the drive control system are shown in Table 5. These are target specifications provided for the drive control system in order to curb the total image shift on the film surface within a range of 60 $\mu$m as an image shift compensating camera.

In Table 5, the total movement amount ±2 mm (on the optical axis) is a movement amount necessary to compensate for an image shift of ±1.5°. That is, when the lens is moved by 2 mm, the light passing through the compensating lens is bent at 1.5°. The reason why the axial total movement amount ±2 mm (a range of 4 mm) is different from the total movement amount ±1 (a range of 2 mm) of the position detector is that this embodiment employs the structure of the compensating lens portion shown in FIG. 31.

Figure 31:
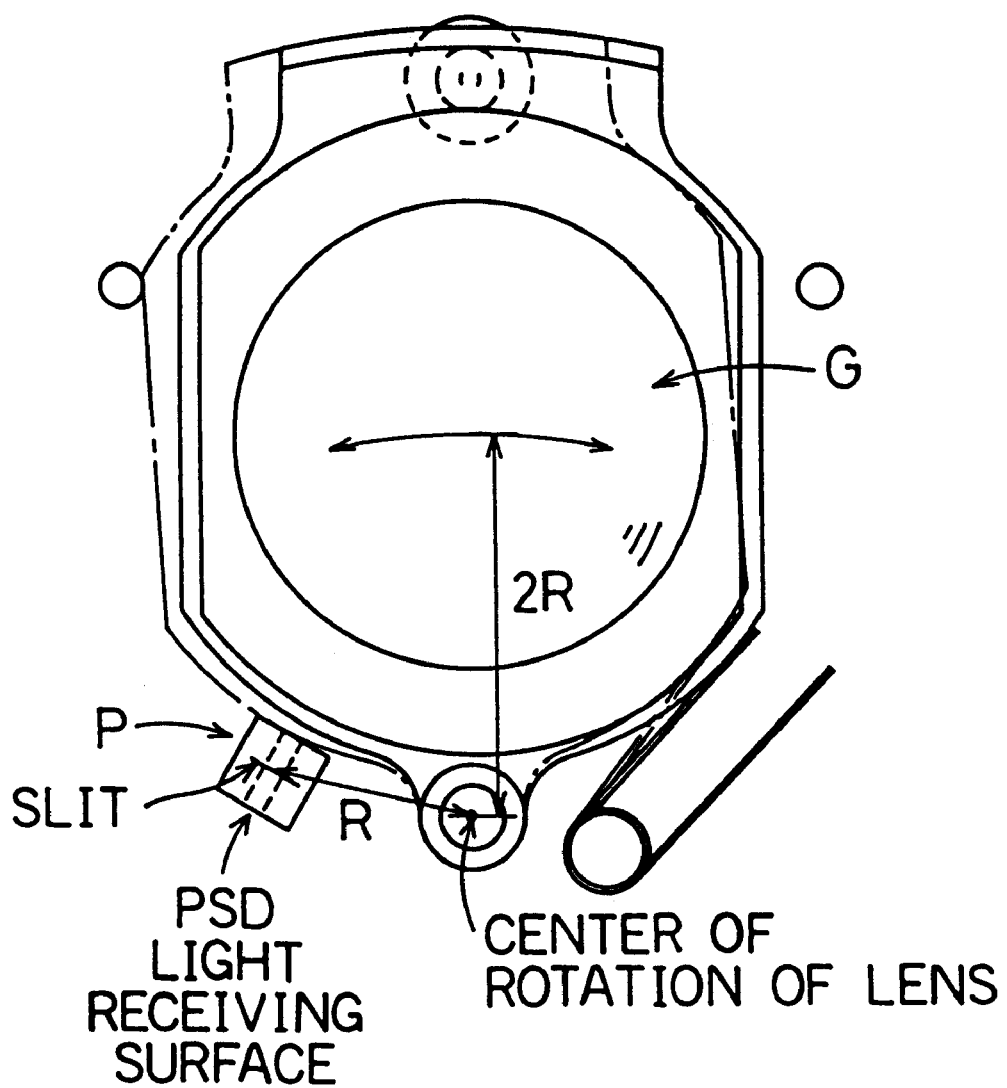
FIG. 31 is a front view showing the arrangement of the compensating lens.

Referring to FIG. 31, the advantage will be described. First, the drive principle of the compensating lens G will be described. The compensating lens G is a lens for compensating for image shifts in the left and right direction. Its movements are shown by a straight line figure and a dash and dotted line figure. To give the priority to moving the lens smoothly, the compensating lens is moved about the center of rotation of the lens. The center of optical axis is a distance 2R away from the center of rotation of the lens. The position detector is a distance R away from the center of rotation of the lens. In this arrangement, when the compensating lens G is rotated at an angle $\theta$, the relationship between the movement amount $x_1$ about the center of optical axis and the movement amount $x_2$ of the position detector is $x_1 = 2R\tan\theta$ and $x_2 = R\tan\theta$. Therefore, $x_2 = (\frac{1}{2})x_1$.

Therefore, even when an image shift of $\pm 1.5°$ on the optical axis ($\pm 2$ mm in movement amount) is compensated for, the movement amount at the position detector P is $\pm 1$ mm. To detect the position of $\pm 1$ mm (a range of 2 mm), even if the attachment precision of the position detector P is considered, a sufficient detection range is obtained by using a PSD of approximately $1 \times 3.5$ mm size.

Returning to FIG. 30, the role of each block of the drive control IC will be described. As the drive control IC, a control IC for G1 lens compensation and a control IC for G2 lens compensation are provided on the same chip. A motor drive IC 50 is arranged as a device which supplies a voltage corresponding to a gain calculated by the microcomputer 4 as a side which supplies an input signal. The motor drive IC 50 rotates driving motors Ma and Mb to drive the compensating lenses G1 and G2.

The upper part of the drive control IC is for G1 lens compensation and the lower part thereof is for G2 lens compensation. Since they have substantially the same arrangement, the lower part for G2 lens compensation will mainly be described. In FIG. 30, the elements of the upper part for G1 lens compensation the same as those of the lower part are denoted by the same reference numerals with the last letters changed from b to a.

First, the position detector will be described. Reference designation 51b represents an LED for a position sensor which emits light to a PSD 52b through a slit. The PSD 52b receives the light and has a reverse bias voltage applied thereto by a PSD reverse bias generator 53b.

$I_{b1}$ and $I_{b2}$ are currents corresponding to the position of the lens G2 and converted into voltages $V_{b1}$ and $V_{b2}$ by I/V converters 54b and 55b. Then, to make $V_{b1}+V_{b2}$ constant, a signal of $V_{b1}+V_{b2}$ is obtained at an adder 56b. Reference designation 57b represents an LED current control block which, when $V_{bt}=V_{b1}+V_{b2}$ changes from a predetermined value, e.g. −5V, a current corresponding to the difference is added to or subtracted from an LED drive current to maintain constant the light quantity of the LED 51b, i.e. $v_{bt}$.

$$G_b\{v_{bt}-(-5)\}+I_{e0}=I_e$$

where $I_{e0}$ is a reference current for driving the LED so that the sum total of the photocurrents of the PSD is −5V, $I_e$ is an actual drive current of the LED, and $G_b$ is a gain for a voltage difference (photocurrent difference).

At a subtracter 58b, since $V_{bt}$ is constant, $V_{b1}-V_{b2}$ is obtained by using the principle of the above expression 31 to obtain position information of the lens G2. Reference designation 59b represents a voltage (V/V) converter to obtain the correspondence between a target position voltage signal $V_{bxt}$ and an actual lens position voltage signal $V_{bxn}$. The signal becomes (the lens G2 position information−Vbxn) after having passed through the V/V converter 59b.

Subsequently, the output of the target position signal will be described. The target position signal from the microcomputer 4 is transmitted onto the circuit as a target position signal of $V_{axt}$ and $V_{bxt}$ through a D/A converter 60, sample and hold (S/H) circuits 61a and 61b, and low pass filters (LPF) 62a and 62b.

Figure 32:
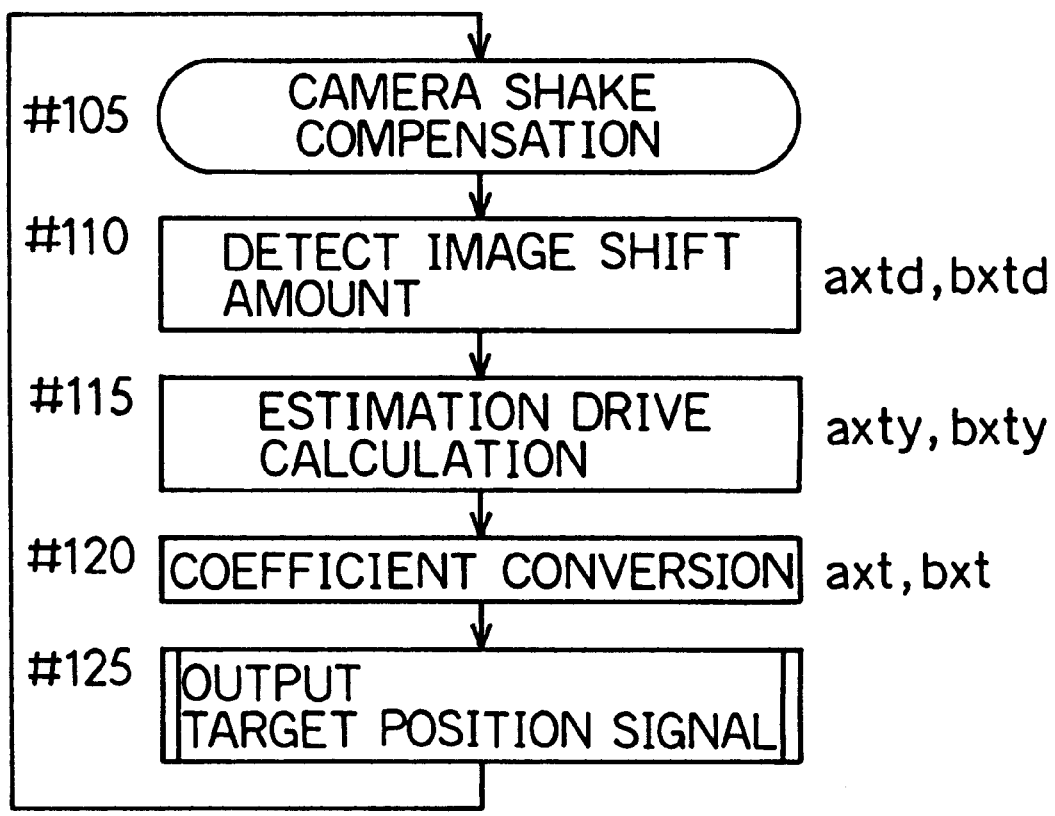
FIG. 32 is a schematic view of assistance in explaining a calculation performed in extracting the reference data.

Confirming now the general flow of the image shift compensation of this embodiment, as shown in the flowchart of FIG. 32, the cycle of one image shift compensation is such that after the image shift compensation operation is started at step #105, the image shift amount is detected at step #110 and an estimation drive calculation is performed at step #115. Then, target compensation positions axt and bxt of the compensating lenses G1 and G2 are obtained at step #120 and the result is outputted to the drive control circuit at step #125.

In this sequence, in order to realize an image shift compensation, a method is easily considered to provide two D/A converters in the image shift drive control circuit to hold its output until the next detection result is calculated. However, in order to detect with a precision of $\frac{1}{1000}$ within a total movement amount of 4 mm (2 mm in the position detector) to realize a position control precision of $\frac{1}{250}$, an output precision of $\frac{1}{250}$ is insufficient.

Consequently, a precision of at least $\frac{1}{1000}$ is required as the precision of the output D/A converter. The D/A converter satisfying this precision is at least a type having 10 bit precision and increasing monotonously or a type having at least 12 bit precision. In this case, a D/A converter of a precision of at least 10 bit is high in cost and great in area when manufactured in integrated circuit form. Such a problem is solved by the arrangement of this embodiment which uses S/H circuits.

Figure 33:
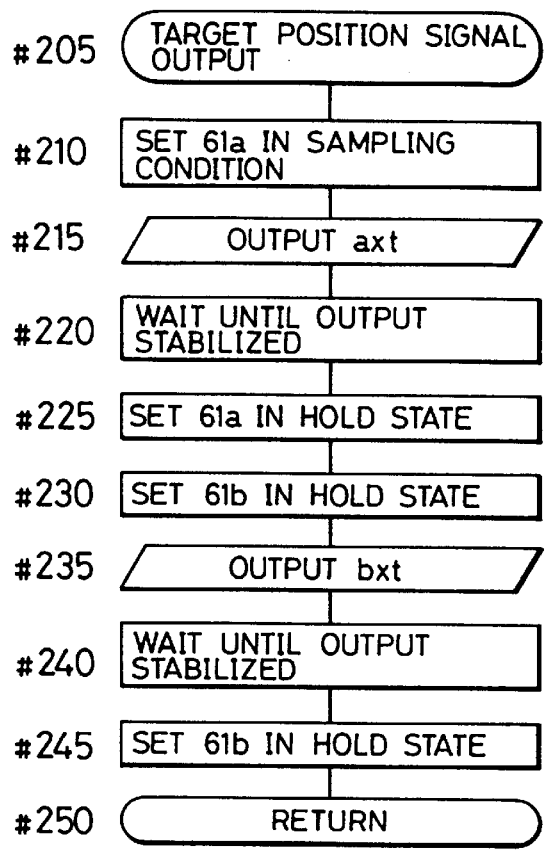
FIG. 33 is a flowchart showing a cycle of camera shake compensation.

The sequence is shown in the flowchart of FIG. 33. This describes the details of the target position signal output of FIG. 32. When this subroutine is called at step #205, the S/H circuit 61a is set in sampling state to output data to the compensating lens G1.

Then, at step #215, a digital signal of axt representative of a target position of the compensating lens G1 is outputted to the D/A converter. Consequently, after passing through the 10 bit D/A converter 60, the signal is transmitted to the LPF 62a by way of the S/H circuit 61a and has its high-frequency component cut. Then, the signal is outputted to G1 motor gain setting portions 63a to 67a as a voltage signal representative of a target position of Vaxt.

At step #220, the process waits until the output of the S/H circuit 61a to correctly set the axt signal is stabilized. Then, at step #225, the S/H circuit 61a is set in hold state. Thereby, the target position signal is maintained Vaxt until the S/H circuit 61a is set in sampling state next time. Then, a target position data Vbxt is outputted to the compensating lens G2.

At steps #230 to #245, the operations of steps #210 to #225 are executed for the S/H circuit 61b and LPF 62b for the lens G2. Consequently, the target position data Vbxt is outputted to G2 motor gain setting portions 63b to 67b to maintain Vbxt until the next target position is calculated.

Subsequently, the gain setting circuit will be described. For the target position signal voltage Vbxt and the present position signal voltage Vbxn, the position deviation is calculated by an adding circuit 65b to set an optimum gain Gbx by a V/V circuit 66b. The target position signal passing through a differentiating circuit 63b is converted into a target speed signal Vvtb, and at a differentiating circuit 64b, −Vvnb is outputted. The optimum gain Gbv is set to a speed difference signal by the V/V circuit 67b to be transmitted to the drive IC 50 as a voltage signal. The optimum gains Gbx and Gbv as referred to here are gains which responds at a high speed with a response delay within the target specification and does not oscillate even if disturbance intrudes.

Compensation coefficients $K_M$ and L for compensating for the change with time will be described. The compensation coefficients are conversion coefficients to control the lens to move to a correct position by automatically compensating for the target position signal even when there is a difference between the target position signal and the actual position of the compensating lens because of a mechanical change with time or a change of a circuit signal with time.

Figure 34:
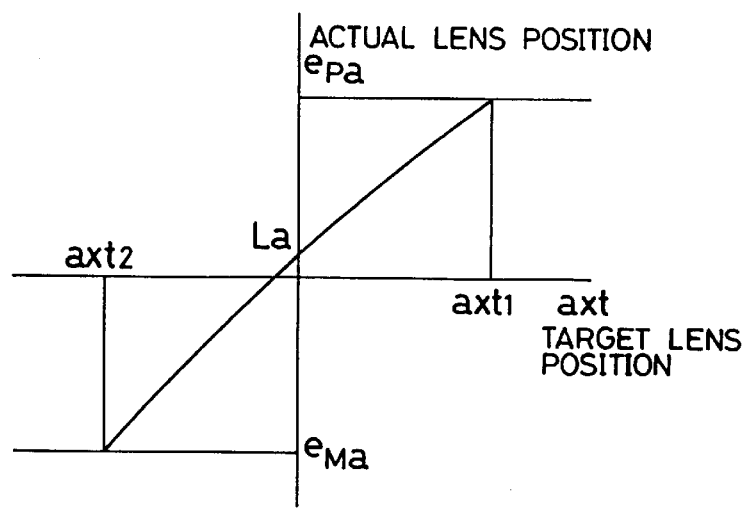
FIG. 34 is a flowchart showing a subroutine of a target position signal output.

Referring to FIG. 34, there is shown a relationship between the compensation coefficients of the compensating lens G1. $e_{Pa}$ and $e_{Ma}$ are distances from the center of the compensation range to a mechanical stop position. In this case, $e_{Pa}$=+2 mm, $e_{Ma}$=−2 mm. $a_{xt1}$ is outputted from the D/A converter when the lens reaches the mechanical position $e_{Pa}$ on the + side. A target position signal $a_{xt2}$ is a target position signal when the lens reaches the mechanical position $e_{Ma}$ on a − side. From the relationship between $e_{Pa}$, $e_{Ma}$, $a_{xt1}$ and $a_{xt2}$, an actual position $a_{xn}$ to which the lens is desirably moved and a signal $a_{xt}$ outputted from the D/A converter as the target position can be expressed by the following expression 33:

$$L_a = \frac{a_{xt1} + a_{xt2}}{2}$$

$$K_{Ma} = \frac{a_{xt1} - a_{xt2}}{e_{Pa} - e_{Ma}}$$

$$a_{xt} = K_{Ma} \times a_{xn} + L_a$$

Expression 33

Figure 36:
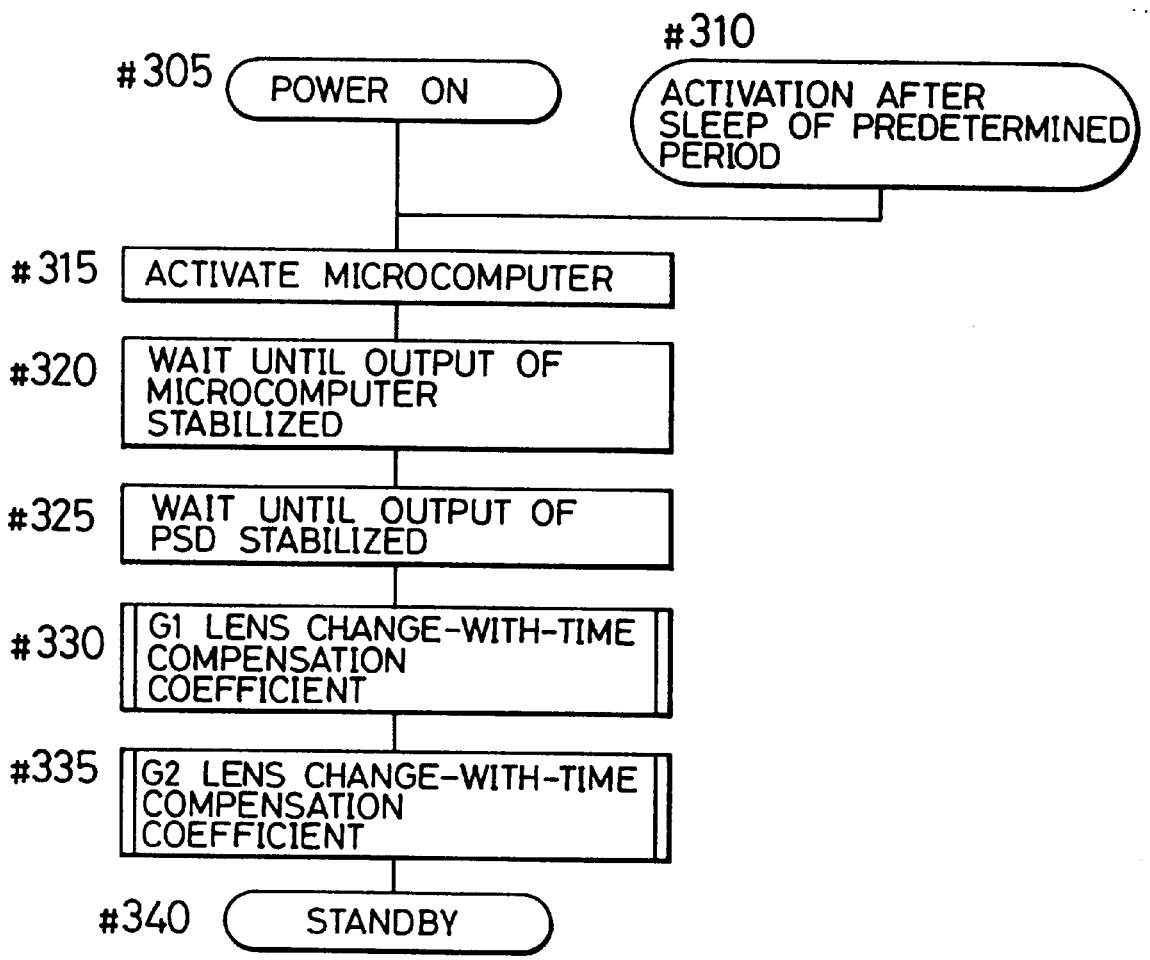
FIG. 36 is a flowchart showing how the change-with-time compensation coefficient is obtained.

How the change-with-time compensation coefficients are obtained will specifically be described. FIGS. 35 and 36 show the general flows. In this embodiment, the change-with-time compensation coefficients are obtained (1) when the power of the camera is activated (step #305) and (2) when the power is activated after the camera has been in sleep state (a state where the camera sleeps due to low power consumption) for a predetermined period of time (step #310).

After the power activation of (1) or (2), the microcomputer 4 is activated, and the process waits until the output of the microcomputer 4 is stabilized (steps #315 and #320). Then, with the lens maintained stopped, the process wait until the output voltage of the PSD (actually, the output of the A/D converter) is substantially stabilized (step #325). Thereafter, the change-with-time compensation coefficients of the compensating lenses G1 and G2 are measured (steps #330 and #335).

Figure 37:
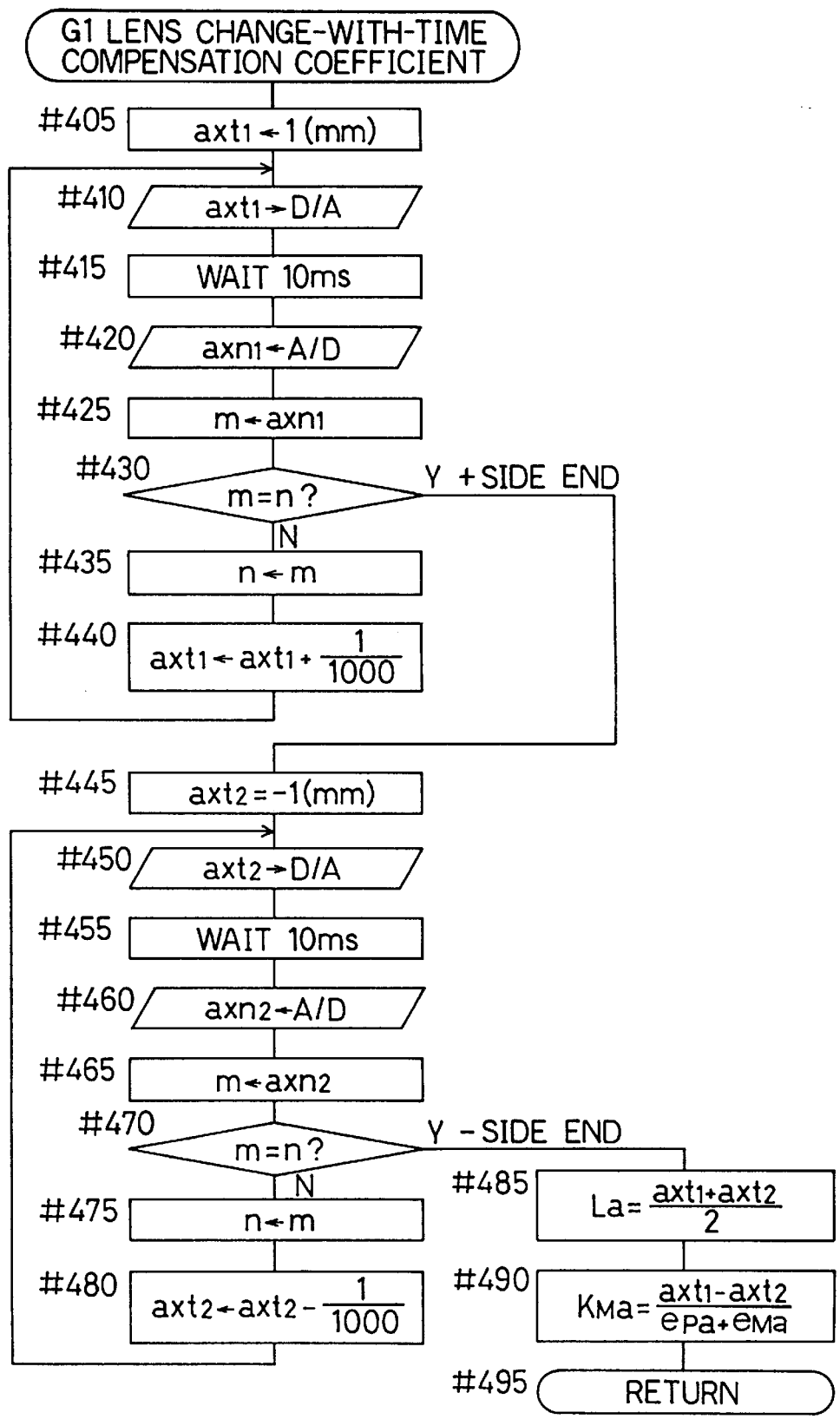
FIG. 37 is a flowchart showing a subroutine to obtain a change-with-time compensation coefficient of the front compensating lens.

Referring to FIG. 37, there is specifically shown how the change-with-time coefficient of the compensating lens G1 is obtained. When this subroutine is called, first, a sequence is executed to obtain the end in the + direction. $a_{xt1}$ is set to 1 mm and the value is outputted from the D/A converter (steps #405 and #410). After the process waits 10 ms until the actually-driven lens reaches the target position, an actual position signal is inputted from the A/D converter (steps #415 and #420).

This value is inputted to a variable m and compared with an A/D value n obtained when the previous target position (in this case, a value smaller by 1/1000 mm) is outputted (steps #425 and #430). When the present value m equals the previous value n, the position is determined to be end and the process proceeds to the detection of the end on the − side. When the values m and n differ from each other, since the lens has not reached the end, m is substituted for n and a sequence is repeated where a signal obtained by adding 1/1000 mm to $a_{xt1}$ is used as the output of the D/A circuit (steps #435 and #440).

Subsequently, a processing at the − side end performed after the lens reaches the + side end will be described. Basically, this process is the same as that of the case of the + side. −1 mm is substituted for $a_{xt2}$, and $a_{xt2}$ is outputted from the D/A converter (steps #445 and #450). After the process waits 10 ms, the $a_{xn2}$ signal is inputted from the A/D converter. This signal is substituted for m, and when it equals the value n of the previous target position signal, it is determined that the lens has reached the end. When they are not equal to each other, since the lens has not reached the end yet, a loop where ($a_{xt2}$−1/1000) is substituted for the $a_{xt2}$ signal and outputted from the D/A converter (steps #455 to #480). After the lens has reached the − side end, calculations of steps #485 and #490 are performed to obtain $L_a$ and $K_{Ma}$ shown by the above expression 33. Finishing this processing, the process returns at step #495.

Figure 38:
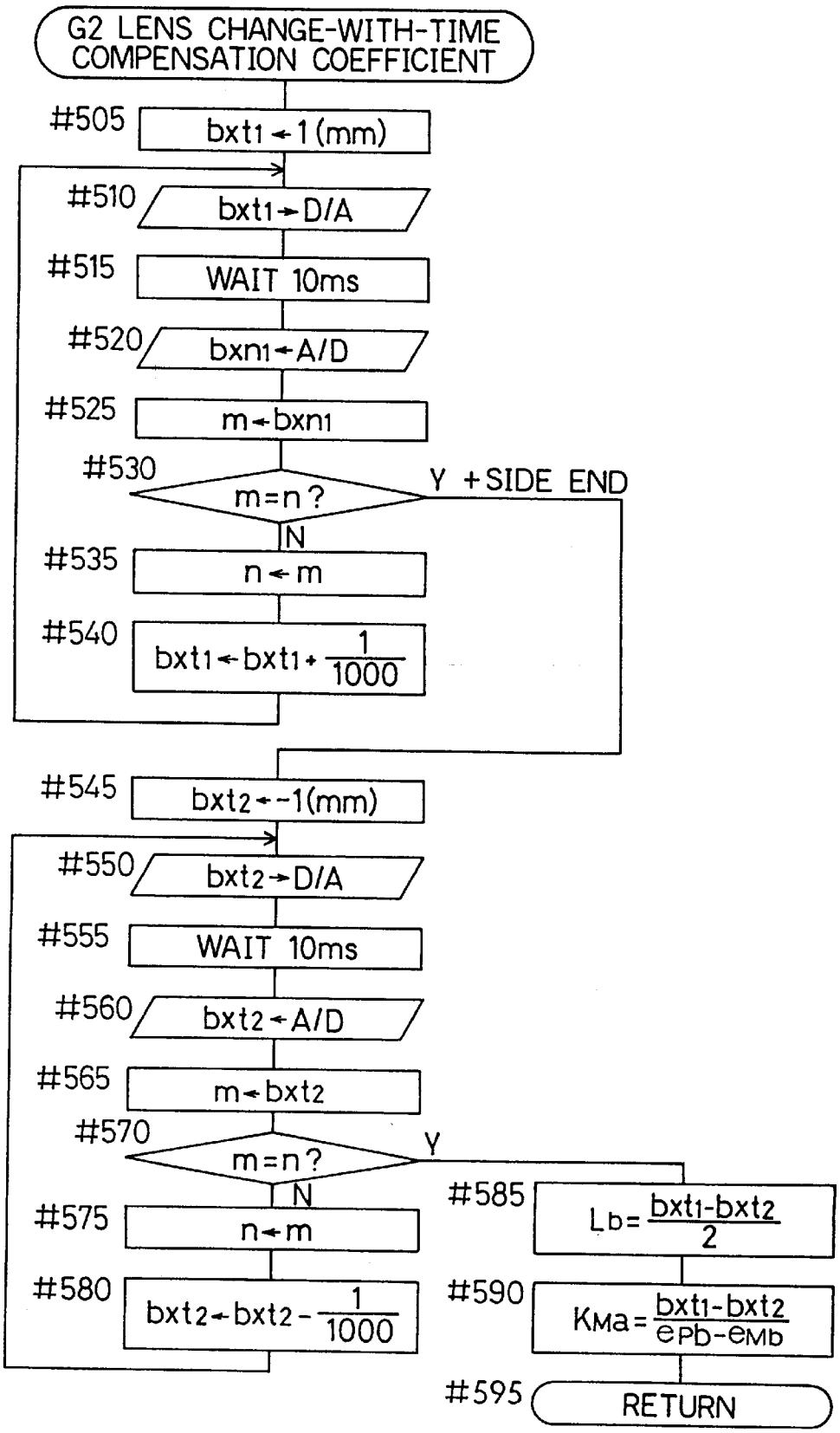
FIG. 38 is a flowchart showing a subroutine to obtain a change-with-time compensation coefficient of the rear compensating lens.

FIG. 38 shows in detail how the change-with-time compensation coefficient of the compensating lens G2 is obtained. This processing will not be described since its flow is substantially the same as that of the compensating lens G1 shown in FIG. 37. Through this subroutine, $L_b$ and $K_{Mb}$ are calculated as shown by the following expression 34:

$$L_b = \frac{b_{xt1} + b_{xt2}}{2}$$

$$K_{Mb} = \frac{b_{xt1} - b_{xt2}}{e_{Pb} - e_{Mb}}$$

$$b_{xt} = K_{Mb} \times b_{xn} + L_b$$

Expression 34

As described above, according to the present invention, by using the direction of luminance variation of a subject image formed on the light receiving surface of an image sensing device in addition to the conventionally-used contrast thereof in order to estimate the detection precision of the solid-state image sensing device which detects an image shift, more correct estimation of detection precision is enabled. By detecting an image shift by using only a partial area of the solid-state image sensing device where the detection precision is estimated to be sufficiently high, more precise image shift detection is enabled with a smaller amount of calculation.

Obviously, many modifications and variations of the present invention are possible in light of the above teachings. It is therefore to be understood that within the scope of the appended claims, the invention may be practiced other than as specifically described.

TABLE 1

| ($\theta_x$, $\theta_y$) | ($x_1$, $y_1$) | ($x_2$, $y_2$) |
|---|---|---|
| (2xk, 2xk) | (−0.0896, 1.8905) | (−2.0896, −0.1095) |
| (2xk, −2xk) | (−0.1118, −2.1118) | (−2.1118, −0.1118) |
| (−2xk, 2xk) | (−0.0913, 1.9087) | (1.9087, −0.0913) |
| (−2xk, −2xk) | (−0.1095, −2.0896) | (1.8905 −0.0896) |

Unit: mm

TABLE 2

| Input | Output | | |
|---|---|---|---|
| ($\theta_x$, $\theta_y$) | ($x_1$, $y_1$) | ($x_2$, $y_2$) | ($\theta_x$, $\theta_y$) |
| (2xk, 2xk) | (−0.0895, 1.89) | (−2.09, −0.1095) | (2.0005xk, 1.9995xk) |
| (2xk, −2xk) | (−0.1116, −2.11) | (−2.11, −0.1116) | (1.9984xk, −1.9984xk) |
| (−2xk, 2xk) | (−0.0914, 1.91) | (1.91, −0.0914) | (−2.0014xk, 2.0014xk) |
| (−2xk, −2xk) | (−0.1095, −2.09) | (1.89, −0.0895) | (−1.9995xk, −2.0005xk) |

Unit: mm

TABLE 3

| ($\theta_x$, $\theta_y$) | ($x_1$, $y_1$) | ($x_2$, $y_2$) |
|---|---|---|
| (4xk, 2xk) | (−0.0804, 1.7913) | (−2.0402, −0.1043) |
| (4xk, −2xk) | (−0.1228, −2.2130) | (−2.0614, −0.1065) |
| (−4xk, 2xk) | (−0.0819, −1.8076) | (1.9591, −0.0962) |
| (−4xk, −2xk) | (−0.1201, −2.1886) | (1.9399 −0.0943) |

Unit: mm

TABLE 4

| Input | Output | | |
|---|---|---|---|
| ($\theta_x$, $\theta_y$) | ($x_1$, $y_1$) | ($x_2$, $y_2$) | ($\theta_x$, $\theta_y$) |
| (4xk, 2xk) | (−0.0803, 1.79) | (−2.04, −0.1043) | (3.9997xk, 1.9986xk) |
| (4xk, −2xk) | (−0.1225, −2.21) | (−2.06, −0.1064) | (3.9975xk, −1.9973xk) |
| (−4xk, 2xk) | (−0.0821, 1.81) | (1.96, −0.0963) | (−4.0021xk, 2.0025xk) |
| (−4xk, −2xk) | (−0.1203, −2.19) | (1.94, −0.0943) | (−4.0003xk, −2.0014xk) |

Unit: mm

TABLE 5

| Target Specifications of Image Shift Compensation Driving System | |
|---|---|
| Total movement amount | ±2 mm (on optical axis) |
| | ±1 mm (position detector) |
| Position detection precision | ±4 μm (on optical axis) |
| | resolution of 1/1000 |
| Position control precision | ±15 μm (on optical axis) |
| Response delay | 2.5 ms |

What is claimed is:

1. A camera having an image shift detecting function, comprising:
an optical system which forms a subject image;
an image sensing device which receives the subject image formed by the optical system to convert the subject image into an electric signal;
image shift detecting means for detecting a relative movement between a camera body and a subject based on an output of the image sensing device;
luminance variation detecting means for detecting luminance variation among different positions within a given subject image, said luminance variation being detected in each of two transverse directions within said given image, based on the output of the image sensing device, and for comparing relative rates of change of the luminance in each of said two transverse directions;
selecting means for selecting one partial area of the image sensing device that corresponds to an area of the given image having a relatively high rate of change of luminance in both of said two transverse directions, based on an output of the luminance variation detecting means; and
controlling means for controlling the image shift detecting means to detect an image shift by using only an output corresponding to the partial area of the image sensing device selected by the selecting means.

2. A camera as claimed in claim 1, further comprising compensating means for compensating for the relative movement between the camera body and the subject based on an output of the image shift detecting means.

3. A camera as claimed in claim 1, wherein said image sensing device is an area sensor having its light receiving surface divided into a plurality blocks including a predetermined number of pixels, and wherein said luminance variation detecting means detects the direction of luminance variation for each of said blocks, and wherein said selecting means selects at least one of the plurality of blocks based on the output of the luminance variation detecting means.

4. A camera as claimed in claim 3, wherein said luminance variation detecting means comprises:
self-correlation means for, in a first area of said area sensor and in a second area including the first area and larger than the first area, shifting outputs corresponding to the areas by predetermined pixels to detect a degree of correlation; and
discriminating means for discriminating the luminance variation of the subject image based on an output of said self-correlation means.

5. The camera of claim 1 wherein said luminance variation detecting means compares said relative rates of change by determining the slopes of the change of luminance in each of said two directions, and detecting an angle of intersection between the two slopes.

6. The camera of claim 5 wherein one of the factors employed by said selecting means in the selection of said partial area is whether said angle of intersection is closer to 90° in the selected area than in other areas of the image.

7. The camera of claim 6 wherein another factor employed by said selecting means is whether the luminance variation in said two directions is higher in the selected area than in other areas of the image.

8. A camera having an image shift detecting function, comprising:
an optical system which forms a subject image;
an image sensing device which receives the subject image formed by the optical system to convert the subject image into an electric signal;
image shift detecting means for detecting a relative movement between a camera body and a subject based on an output of the image sensing device;
contrast detecting means for detecting contrast between different positions in a given subject image, in each of two transverse directions, based on the output of the image sensing device;
selecting means for selecting one partial area of the image sensing device that corresponds to an area of the given image having high contrast in each of said two transverse directions, relative to the detected contrast in other areas of the image sensing device; and
controlling means for controlling the image shift detecting means to detect an image shift by using only an output corresponding to said one partial area of the image sensing device selected by the selecting means.

9. A camera as claimed in claim 8, further comprising compensating means for compensating for the relative movement between the camera body and the subject based on an output of the image shift detecting means.

10. A camera as claimed in claim 8, wherein said image sensing device is an area sensor having its light receiving surface divided into a plurality blocks including a predetermined number of pixels, and wherein said contrast detecting means detects the contrast for each of said blocks, and wherein said selecting means selects at least one of the plurality of blocks based on the output of the contrast detecting means.

11. A camera as claimed in claim 10, wherein said contrast detecting means comprising:

self-correlation means for, in a first area of said area sensor and in a second area including the first area and larger than the first area, shifting outputs corresponding to the areas by predetermined pixels to detect a degree of correlation; and discriminating means for discriminating the contrast of the subject image based on an output of said self-correlation means.

* * * * *